(12) United States Patent
Ogg et al.

(10) Patent No.: US 9,783,378 B2
(45) Date of Patent: Oct. 10, 2017

(54) LOADING DOCK RAINSHIELD

(71) Applicants: Dale A. Ogg, Ashley, OH (US); William Heath Nesselroad, Upper Arlington, OH (US)

(72) Inventors: Dale A. Ogg, Ashley, OH (US); William Heath Nesselroad, Upper Arlington, OH (US)

(73) Assignee: Nordock, Inc., Bowmanville, Ontario (CA)

( * ) Notice: Subject to any disclaimer, the term of this patent is extended or adjusted under 35 U.S.C. 154(b) by 34 days.

(21) Appl. No.: 14/988,520

(22) Filed: Jan. 5, 2016

(65) Prior Publication Data
US 2017/0190522 A1    Jul. 6, 2017

(51) Int. Cl.

| | |
|---|---|
| *B65G 69/00* | (2006.01) |
| *E04F 10/02* | (2006.01) |
| *E04H 14/00* | (2006.01) |
| *E04F 10/06* | (2006.01) |
| *E04H 15/04* | (2006.01) |

(52) U.S. Cl.
CPC ............ *B65G 69/008* (2013.01); *E04F 10/02* (2013.01); *E04F 10/0662* (2013.01); *E04F 10/0692* (2013.01); *E04H 14/00* (2013.01); *E04H 15/04* (2013.01)

(58) Field of Classification Search
CPC ......... E04H 15/20; E04H 15/58; E04H 14/00; E04H 15/04; B65G 69/001; B65G 69/2876; B65G 69/003; B65G 69/008; E04F 10/02; E04F 10/0662; E04F 10/0692

USPC ............ 52/2.11, 2.12, 2.13, 173.1, 173.2, 73
See application file for complete search history.

(56) References Cited

U.S. PATENT DOCUMENTS

| | | | |
|---|---|---|---|
| 3,230,675 A | 1/1966 | Frommelt et. al. | |
| 3,403,489 A | 10/1968 | Frommelt et. al. | |
| 3,557,508 A | 1/1971 | Frommelt et. al. | |
| 3,653,173 A | 4/1972 | Frommelt et al. | |
| 3,714,745 A | 2/1973 | O'Neal | |
| 3,826,049 A | 7/1974 | Frommelt et al. | |
| 3,875,954 A * | 4/1975 | Frommelt ............ | B65G 69/008 135/115 |
| 3,939,614 A | 2/1976 | Frommelt et al. | |
| 4,003,170 A | 1/1977 | Mellyn | |
| 4,020,607 A | 5/1977 | Bjervig | |
| 4,213,279 A | 7/1980 | Layne | |

(Continued)

*Primary Examiner* — Brian Glessner
*Assistant Examiner* — Adam Barlow
(74) *Attorney, Agent, or Firm* — Jeffrey S. Sokol

(57) ABSTRACT

The present loading dock rainshield has a self-adjusting, weighted canopy seal with a header projecting from the building to support a flexible, dual fixed-end, downwardly looped, central curtain. The central curtain spans the dominant width of the header and loops from front to back. The center curtain joins with opposed pleated side curtains to compete the front seal. The downwardly looped central curtain has a series of staggered and overlapping weighted baffles proximal its front end. When a trailer backs into the dock, the trailer top engages one or more baffles, which ride up onto the top of the trailer. The elongated weighted baffles push rainwater off the trailer top as it backs into the bay, and remain in forced sealing engagement with the trailer top when it is parked to divert water off the trailer top and prevent the water from flowing or blowing into the bay.

20 Claims, 18 Drawing Sheets

(56) References Cited

U.S. PATENT DOCUMENTS

| | | | |
|---|---|---|---|
| 4,365,452 A | 12/1982 | Fillman et al. | |
| 4,679,364 A | 7/1987 | Fettig et al. | |
| 4,750,299 A * | 6/1988 | Frommelt | B65G 69/008 14/71.5 |
| 4,873,800 A * | 10/1989 | Frommelt | B65G 69/008 52/173.2 |
| 4,873,801 A * | 10/1989 | Winters | B65G 69/008 52/173.2 |
| 4,916,870 A * | 4/1990 | Moore | B65G 69/008 52/173.2 |
| 5,109,639 A * | 5/1992 | Moore | B65G 69/008 52/173.2 |
| 5,394,662 A * | 3/1995 | Giuliani | B65G 69/008 52/173.2 |
| 5,473,846 A * | 12/1995 | Giuliani | E06B 7/18 49/312 |
| 5,592,792 A * | 1/1997 | Meehan | B65G 69/008 160/184 |
| 5,608,996 A | 3/1997 | Brockman et al. | |
| 5,953,868 A * | 9/1999 | Giuliani | B65G 69/008 52/173.2 |
| 6,073,402 A * | 6/2000 | Moody | B65G 69/008 5/655.9 |
| 6,170,205 B1 | 1/2001 | Styba | |
| 7,757,442 B2 * | 7/2010 | Hoffmann | B65G 69/008 52/173.2 |
| 8,042,307 B2 * | 10/2011 | Digmann | B65G 69/008 160/330 |
| 8,327,587 B2 * | 12/2012 | Digmann | B65G 69/008 52/173.1 |
| 8,915,029 B2 * | 12/2014 | Digmann | B65G 69/008 52/173.2 |
| 9,003,724 B2 * | 4/2015 | Digmann | B65G 69/008 52/173.2 |
| 9,624,049 B1 * | 4/2017 | Heim | B65G 69/008 |
| 2005/0166488 A1 * | 8/2005 | Borgerding | B65G 69/008 52/173.2 |
| 2015/0007513 A1 * | 1/2015 | Digmann | B65G 69/001 52/173.2 |

\* cited by examiner

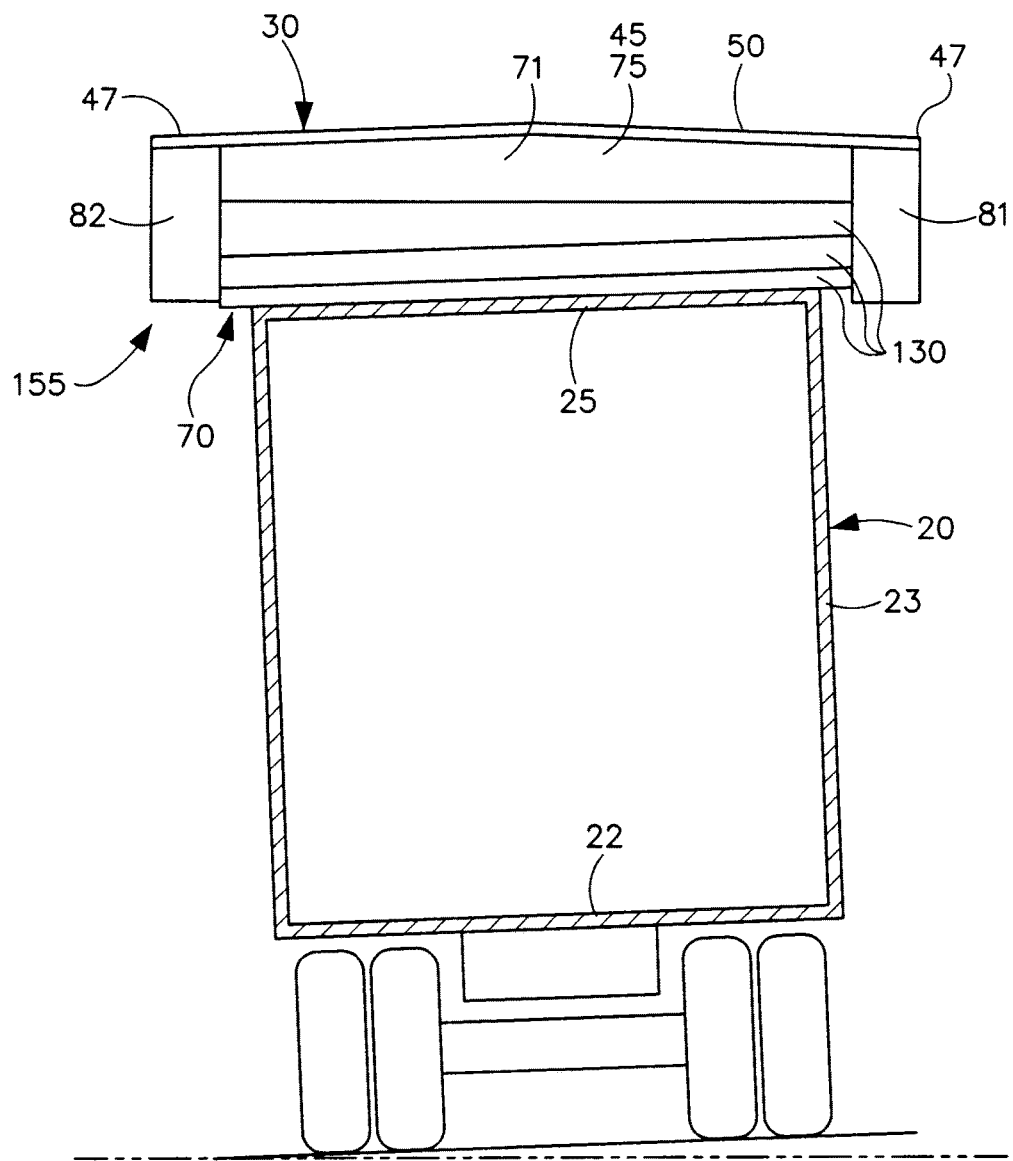

LOADING DOCK RAINSHIELD

TECHNICAL FIELD OF THE INVENTION

This invention relates to a loading dock rainshield with a self-adjusting, canopy seal with a flexible downwardly looped curtain and elongated weighted baffles that smoothly and effectively engage a wide range of trailer heights to push and divert rainwater off the trailer top so that water accumulating on this large surface does not flow or blow under the seal and into the loading bay.

BACKGROUND OF THE INVENTION

Dock seals form a weather seal between a trailer and a loading bay. Various types of dock seals have been developed and are know in the industry. Compression seals that seal against the rear end of the trailer are disclosed in U.S. Pat. Nos. 3,230,675 and 6,170,205. Compressible seals that engage the sides and top end of a trailer are disclosed in U.S. Pat. Nos. 4,679,364 and 4,213,279. Inflatable or expanding seals that engage the sides and top of a trailer are described in U.S. Pat. Nos. 3,714,745; 3,939,614; 4,020,607 and 5,109,639. A loading dock shelter with side curtains mounted to side frames and a head curtain mounted to a top wall is disclosed in U.S. Pat. No. 3,403,489. A loading dock shelter with side and head curtains and compressible springs is disclosed in U.S. Pat. No. 3,826,049. A canopy with vertical side members and compressible springs and a horizontal member is disclosed in U.S. Pat. No. 4,365,452. Various problems exist with each of these dock seals. For example, conventional compression seals are impractical for large variations of trucks and trailers, especially those with rear steps or tail gates. Conventional vertically hung wiping seals or shelters do not provide as good of seal efficiency as a compression seal.

Conventional trailer seals do not effectively prevent rainwater from spilling off the top of a trailer and into the loading bay. This is particularly problematic for loading bays where the ground or approach in front of the bay slopes down toward the loading bay. When a trailer enters or is parked in the loading bay, the top of the trailer is not level, and slopes down toward the bay. Rain water collecting on the large top surface of the trailer is drawn by gravity to flow down its top surface, off its rear end and into the loading bay. Wind can increase the force with which the water is driven down the trailer top and off its rear end. Wind alone can blow water across the top of a parked trailer on a level approach. The result is a slippery, dangerous, uncomfortable and costly situation where water spills or sprays onto the building floor, dock workers, cargo and cargo moving equipment.

Another problem with conventional loading bay seals is that trailers come in a variety of heights. A seal designed to engage the top of a taller trailer will not extend down enough to effectively engage the top of a smaller trailer. Even if the seal extends down far enough to engage the top of the trailer, the seal will not engage the top of the smaller trailer with sufficient force to push away and divert rainwater accumulating on the top of the trailer or prevent the wind from blowing the rainwater under the seal and into the loading bay. As a result, smaller trailers are not properly sealed and rainwater is free to enter the loading bay. Seals designed to properly engage the top of a smaller trailer will not accommodate a larger trailer. Taller trailers will damage the seal when backed into the bay. Any seal or partial seal they make will be ineffective in keeping wind and rainwater out of the loading bay.

A further problem with conventional loading bay seals is that trailers come in a variety of widths. Top seals designed to engage a narrow trailer will not accommodate or fully extend across the top of a wider trailer. Wider trailers can damage the seal, and they will not be properly sealed to prevent wind and rainwater from entering the loading bay.

A still further problem with conventional loading bay trailer seals is that trailers are frequently off center or miss-spotted when backed into the bay. The trailer is not centered with the door opening. One side of the trailer is closer to its side of the door opening, and the other side of the trailer is further away from its side of the door opening. This creates a sealing problem because one side of the trailer will improperly engage its side seal, and the other side of the trailer will altogether miss or improperly engage its side seal. Moreover, a portion of the trailer top will fail to properly engage the top seal, and can miss the top seal altogether.

A still further problem with conventional loading bay trailer seals is that trailers are frequently backed into a bay at an angle. The back end of the trailer is not parallel to the wall of the building. As a result, the sides and top of the trailer do not simultaneously engage the seal. Many seals are not designed to handle this disjointed engagement. As a result, the corners of the trailer can snag or tear the seal, or the unevenly distributed forces reduce seal efficiency. Although one side of the trailer may properly engage the seal, the other will not. As a result, the trailers are not properly sealed, and wind and rain will enter the loading bay.

A still further problem with conventional loading bay trailer seals is that the trailers are often tilted. One side of the trailer is higher or lower than the other. As a result, the sides and top of the trailer do not uniformly engage the seal. Non-uniform engagement generates forces or snags that damage the seal or results in a poor seal. The resulting tears and excessive wear reduce the useful life of the seal.

A still further problem with conventional loading bay trailer seals is that they rely on mechanized controls to adjust for the height and width of the trailer, as well as any angle, tilt or miss-spotting of the trailer. These mechanized controls are expensive and can require frequent maintenance, particularly when improperly used by untrained dock personnel. Mechanized controls also add to labor costs, can damage trailers and dock equipment, and can cause injury to dock personnel.

The present invention is intended to solve these and other problems.

BRIEF DESCRIPTION OF THE INVENTION

The present invention pertains to a loading dock rainshield with a self-adjusting, weighted canopy seal. The canopy seal has a header that projects from the building wall and supports a flexible, dual fixed-end, downwardly looped, central curtain. The central curtain spans the dominant width of the header. Its front and rear ends are fixed to the front and rear ends of the header, respectively. The center curtain joins with opposed pleated side curtains to complete the front seal. The central curtain has a series of downwardly staggered and overlapping weighted baffles proximal its front end. When a trailer backs into the dock, the top rear end of the trailer engages one or more baffles depending on the height of the trailer. The engaged baffles swing back and ride up onto the top surface of the trailer to push rainwater off the top surface as the trailer backs into the bay. The baffles remain in their forced sealing engagement with the trailer top to divert rainwater off the trailer top when the trailer is parked.

The rainshield prevents rainwater from flowing or blowing off the top of a trailer and into the loading bay. The flexible curtain and elongated weighted baffles prevent rain and water from entering the loading bay. The floating baffles are sufficiently weighted and appropriately padded to produce continuous pressed sealed engagement of the canopy seal across the width of the trailer top to prevent water from flowing or blowing under the seal and into the loading bay. The rainshield keeps the loading bay, dock workers, equipment and cargo dry to produce a safe, comfortable and efficient loading bay environment.

The rainshield is self-adjusting to accommodate trailers of varying heights. The central curtain slopes or extends downward along its front end where a series of elongated weighted baffles are secured at staggered heights. The flexibility of the draped central curtain and the height of its multiple, vertically staggered, elongated weighted baffles allow the rainshield to accommodate trailers of varying heights. The trailer top engages one or more baffles depending on the height of the trailer. The weight of each baffles increases with its downward vertical position relative to the other baffles. The bottom most baffle is heavier than a middle baffle, and a middle baffle is heavier than a upper most baffle. While all the baffles engage the top surface of a taller trailer to and push off and divert water from its top surface, at least one or two of the heavier lower baffles engage the top surface of a smaller trailer to effectively push off and divert water from its top surface.

The baffles create layers of protection to divert rain water off the top surface of the trailer. Taller trailers contact all three baffles and benefit from the added protection these additional weighted layers proved. Shorter trailers that only engage the bottom baffle still receive enough pressure from the bottom baffle to effectively divert rainwater. The bottom baffle is heavy enough to prevent wind and rain from blowing between the curtain and the top of the trailer.

The rainshield self-adjusts to accommodate changes in trailer height when cargo is loaded and unloaded. The flexible, downwardly looped, central curtain accommodates a wide range of change in trailer height during the loading and unloading process. The weighted canopy seal continues to provide continuous pressed sealed engagement against the top surface of the trailer as the trailer top rises or falls during loading or unloading to prevent rain from passing under the seal and spilling or blowing into the loading bay. The curved or rounded outer cover of the baffles and their padding allow them to roll on the top surface of the trailer and conform to any deviations in the otherwise flat top surface so that the canopy seal maintains a sufficient and appropriate continuous pressed engagement across the entire width of the top surface of the trailer.

The rainshield self-adjusts for a wide range of parking inconsistencies, such as variations in trailer angle as it enters the bay, trailer rear axle position, trailer tilt or uneven trailer height from left to right, and lateral misalignment or missspotting of the trailer. Costly mechanized controls are not necessary to adjust for these parking inconsistencies. The free-flowing, self-adjusting rainshield automatically compensates for each of these variations or combination of them without reducing the effectiveness of its rainwater diverting capabilities, without damage to the invention, and without reducing the durability of the rainshield.

The rainshield smoothly engages and disengages the top surface of a trailer when it backs into or pulls away from the loading bay. The flexible, downwardly looped, central curtain and its series of staggered and overlapping baffles allow the canopy seal to gradually and smoothly engage and ride up the rear end and onto the top surface of the trailer. The design eliminates or reduces any instantaneous spikes in forces or pressures applied by trailer to the curtain and baffles. The flexible looped design allows the curtain and baffles to smoothly swing or slide up and onto the top of trailer as it enter the loading bay. Wear face pleats are also readily incorporated into the weighted canopy seal design. The risk of trailer corners and sharp edges snagging or tearing the vinyl cover of the baffles and central curtain are reduced. The flexible, looped, dual fixed-end, central curtain also facilitates disengagement. As the trailer pulls away, the weighted baffles smoothly release from the trailer top surface and swing back and forth until they settle rather than any suddenly jerking forceful dropping or shock of the relatively heavy baffles.

The rainshield provides the benefit of a long duration for its useful life. The baffles are not pinched between the trailer and building wall or other obstructions, such as compression dock seal pads. The front of the header projects from the building wall far enough to allow for the maximum rearward travel of the baffles. The design allows for a smooth transition of the weighted baffles on and off the trailer top. The design helps avoid sudden jerking drops of the baffles to prevent torn or stretched out seams and materials. The curtains, baffle covers and wear pleats are sufficiently thick and made of durable materials. The lack of rigid mechanized control reduces the weight of the device, which results in less pressure on the unit and the building. The curved, free-flowing design, eliminates or reduces excessive pressures and forces applied to the rainshield when in use.

The rainshield is readily combine and integrated with other trailer sealing devices. For example, when compression seals are located along the sides of the dock opening, the lateral width of the central curtain is readily sized to snuggly and non-bindingly fit between and mate with vertical compression or side wiping seals. The rainshield is also readily integrated with any existing top wipe seal that would otherwise allow rainwater to flow or blow off the trailer top and into the loading bay.

The rainshield forms a continuous flexible seal across its entire lateral width. The design includes pleated side curtains that are joined to the front of the central curtain. The central curtain and elongated baffles combined with integrated pleats of the side curtains to create a complete seal along the entire top surface of the trailer or container. The pleats allow the top seal formed by the canopy seal to flexibly expand and retract when a trailer enters and exits the loading bay. The side curtains also extend around the sides of the header, and help to continually block airflow, rainwater and light from entering the loading bay along the front and sides of the canopy seal. The time and expense of installing an addition drop curtain or the like is avoided.

The rainshield provides the benefit of forming an awning that helps shield rainwater from entering the loading bay, even when a trailer is not backed into the bay. The header cover is pitched to directed rainwater falling on the cover to the sides of the loading bay door. The "T" shaped trim along the front of the header forms a gutter or trough that diverts rainwater to the sides of the header, rather than off its front end and onto the trailer or into the bay.

Other aspects and advantages of the invention will become apparent upon making reference to the specification, claims and drawings.

BRIEF DESCRIPTION OF THE DRAWINGS

FIG. 12 is a front end view showing the rainshield accommodating a trailer that is tilting to one side when backed into the loading bay.

FIG. 14B is a front end view showing the rainshield accommodating a laterally misaligned or miss-spotted trailer parked in the loading bay.

DESCRIPTION OF THE PREFERRED EMBODIMENTS

While this invention is susceptible to embodiment in many different forms, the drawings show and the specification describes in detail a preferred embodiment of the invention. It should be understood that the drawings and specification are to be considered an exemplification of the principles of the invention. They are not intended to limit the broad aspects of the invention to the embodiment illustrated.

Figure 1A:
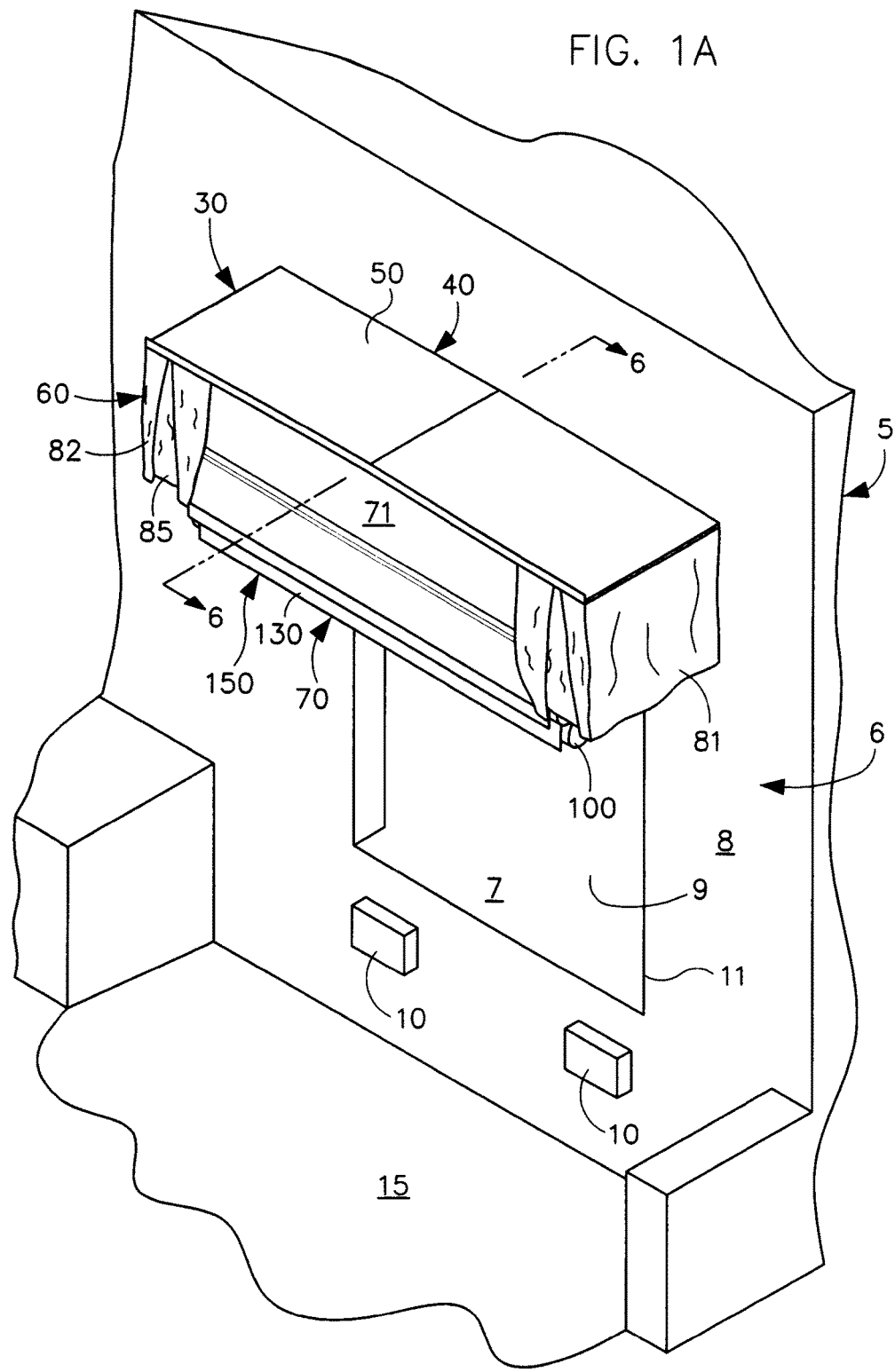
FIG. 1A is a perspective view of the loading dock rainshield secured over the loading bay of a building with its header supporting its flexible canopy seal formed by a looped central curtain, weighted baffles, pleated side curtains and wear face pleats.

Modern commercial buildings 5 for manufacturing, warehousing, distributing and selling goods are equipped with loading docks or bays 6 to efficiently move goods, supplies, furniture, equipment and other forms of cargo in and out of the building. The loading docks 6 have a generally flat, horizontal, elevated floor surface 7 that extends from a generally vertical and planar exterior front wall 8 into the interior 9 of the building 5 as shown in FIG. 1A. The front wall 8 includes laterally spaced bumpers 10 fixed to the wall 8 at a height suitable to engage a trailer when it backs into the dock or bay 6. The distance the bumper 10 extend or project out from the wall 8 varies from building-to-building, but is typically between about 4 to 6 inches, and is commonly 10 inches. The loading bay 6 has an elevated doorway 11. A door such as an overhead door (not shown) is used to selectively open and close the doorway 11. The overhead door seals the doorway 11 when the dock is not in use, and is opened when a trailer backs up to the dock 6 to load or unload cargo. The front wall 8 extends from the paved drive or ground surface 15 up to the elevated dock floor 7. This wall typically extends further up to enclose the interior 9 of the building and bay 6. The dock 6 can be equipped with conventional side wiping seals 17 as in FIG. 1B or conventional dual side wiping and compression seals 18 as in FIG. 1C. The dock 6 can also be equipped with a dock leveler (not shown), such as in U.S. Pat. No. 6,834,409.

Figure 2:
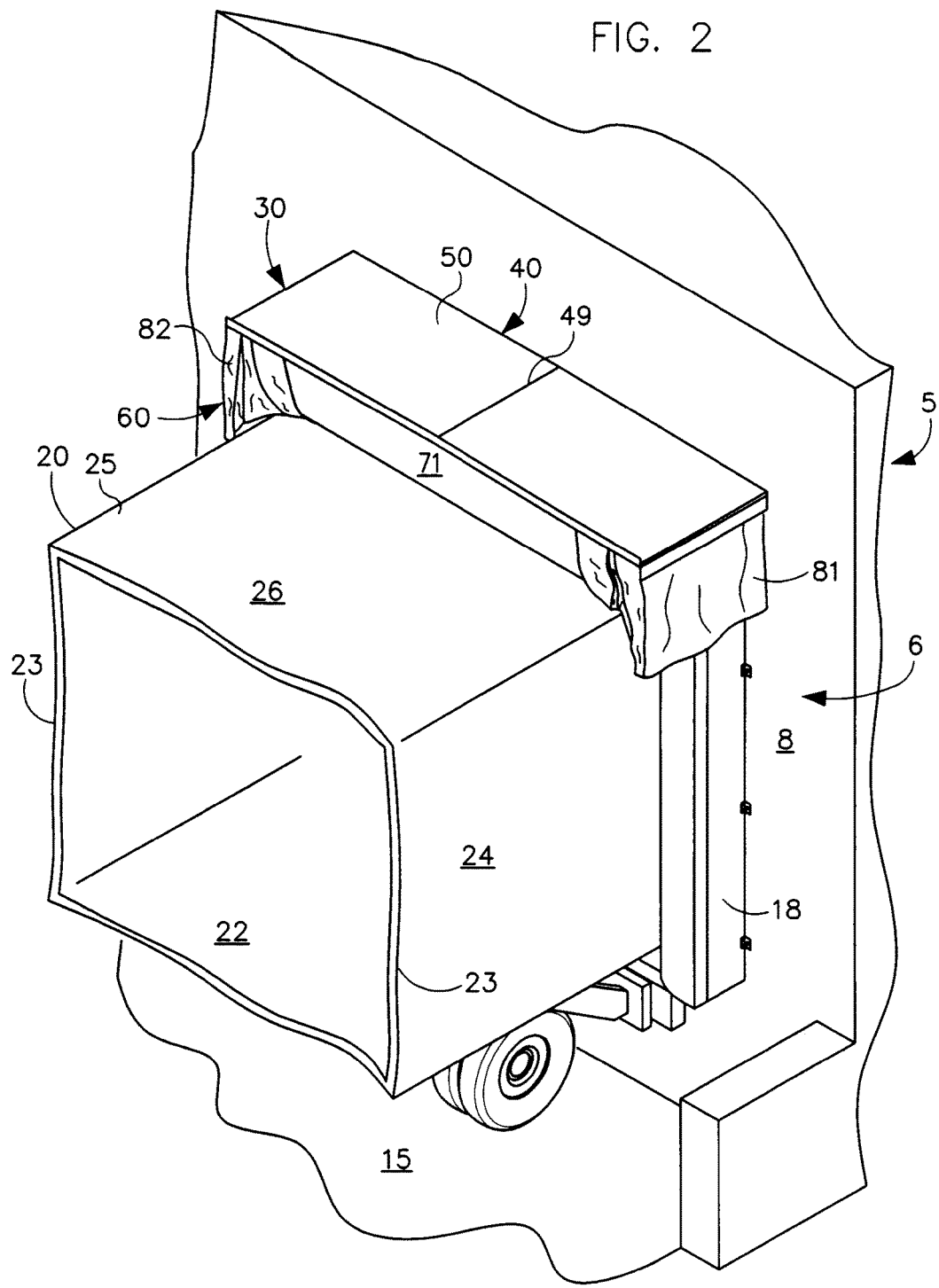
FIG. 2 is a perspective view of the loading dock rainshield with its flexible weighted central curtain and pleated side curtains engaging and forming a continuous top seal across the entire width of the top of a trailer parked in the loading bay, and with the rainshield being used in conjunction with dual side compression and wiping seals.
Figure 3:
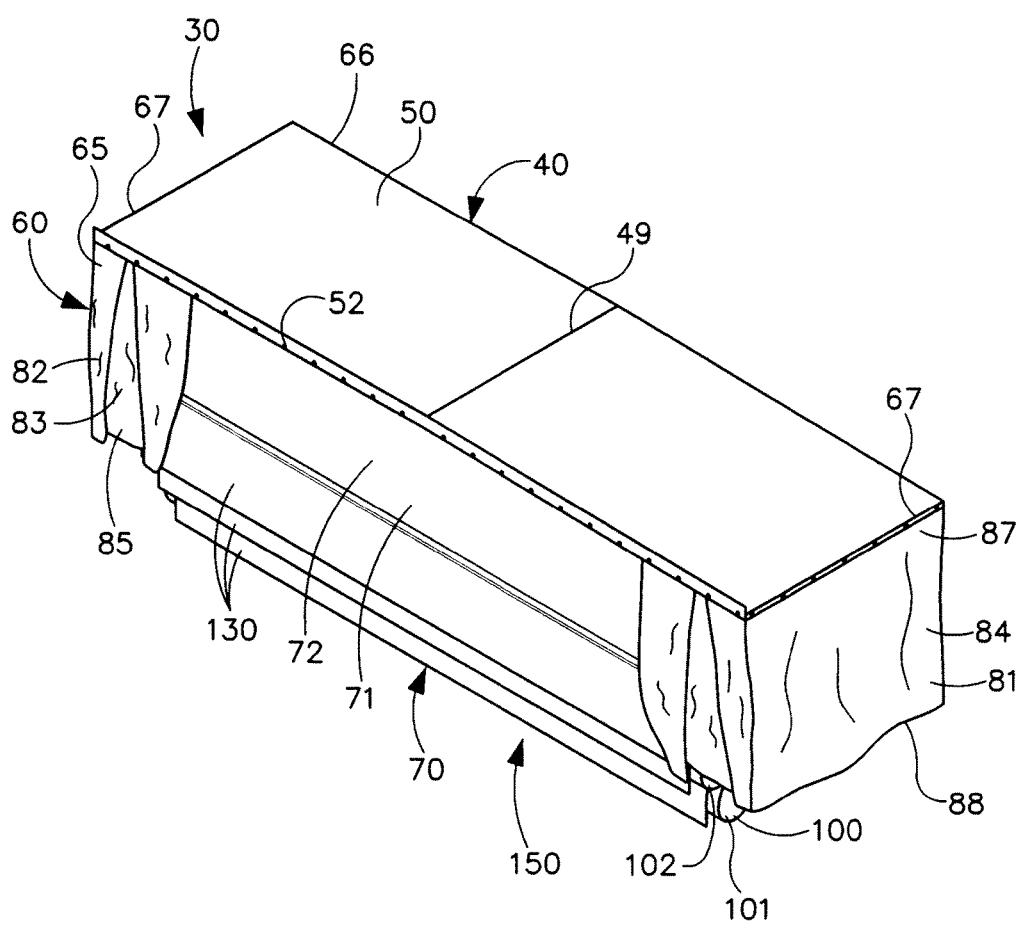
FIG. 3 is a perspective view of the rainshield with its header supporting the flexible canopy seal and its looped central curtain, weighted baffles, wear face pleats and side curtains.

The loading dock 6 is designed to facilitate access to a trailer 20 of a truck or other carrier as shown in FIG. 2. The trailer or container 20 has an elevated bed 22 for placing cargo. The trailer or container 20 also has side walls 23 with an outer surface 24 and a roof 25 with a top surface 26 that form the exterior of the trailer. The rear end 28 of the trailer 30 has an ICC bar located below the trailer bed 22 to engages the bumpers 10 of the loading bay 6. The wheels of the trailer travel on the driveway or approach 15 adjacent the loading dock 6. The dock floor 7 is elevated a desired distance above the adjacent driveway 15 so that the trailer bed 22 is somewhat near the level of the dock floor 7 when trailer 20 backs up to the dock 6. The top surface 26 of a typical trailer 20 is generally flat and can even be slightly downwardly bowed so that rainwater 29 accumulates on the trailer top 26.

The height of the trailer bed 22 and roof 25 relative to the driveway 15, dock floor 7 and opening 11 depend on a variety of factors. These factors include the particular trailer or container 20 involved and the weight of the cargo on the trailer or container. The heights of the trailer bed 22 and its roof surface 26 rise and fall relative to the dock floor and opening 11 as cargo items are placed on or removed from the trailer 20. Typically, the top surface 26 of a trailer 20 has a height ranging from 12 feet (144 inches) to 13 feet, 6 inch (162 inches) above the ground 15. While the present invention is described with reference to a trailer or container 20, it should be understood that various types of cargo transport devices can be substituted without departing from the broader aspects of the invention.

The present invention pertains to a loading dock rainshield generally indicated by reference number 30 as in FIGS. 1-6. The rainshield 30 has a variety of components including a header assembly 40 and a canopy seal assembly 60. The header assembly 40 is robustly designed to support the weight of the rainshield 30 and common loads experienced by the rainshield during use, such as snow and wind loads.

Figure 4:
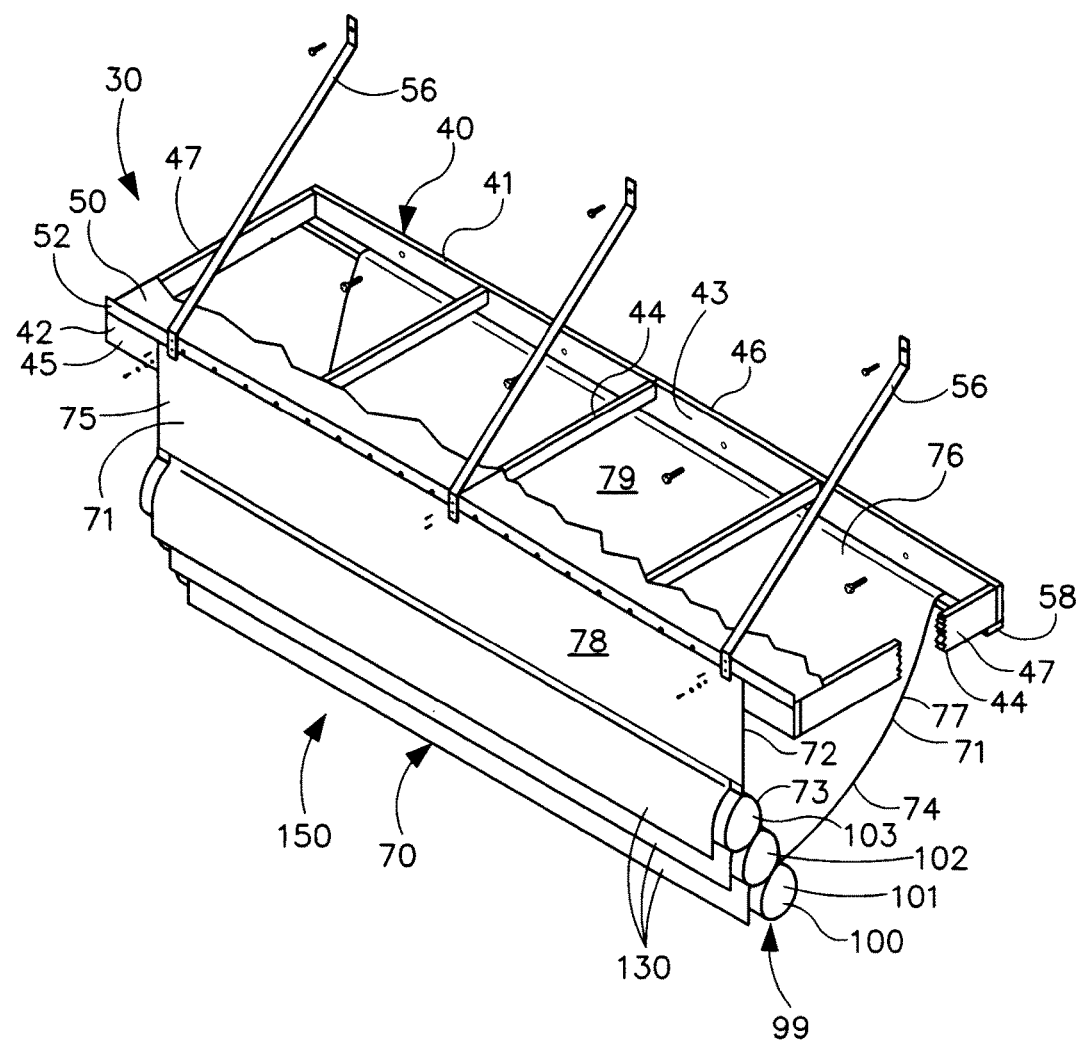
FIG. 4 is a perspective view of the rainshield header with its header supporting the flexible canopy seal and its looped central curtain, weighted baffles, wear face pleats, and with the header cover cut away and the side curtains removed to show the header framing and attachment of the rear end of the center curtain to the rear end of the header, and showing angled brackets supporting the front of the header.
Figure 5:
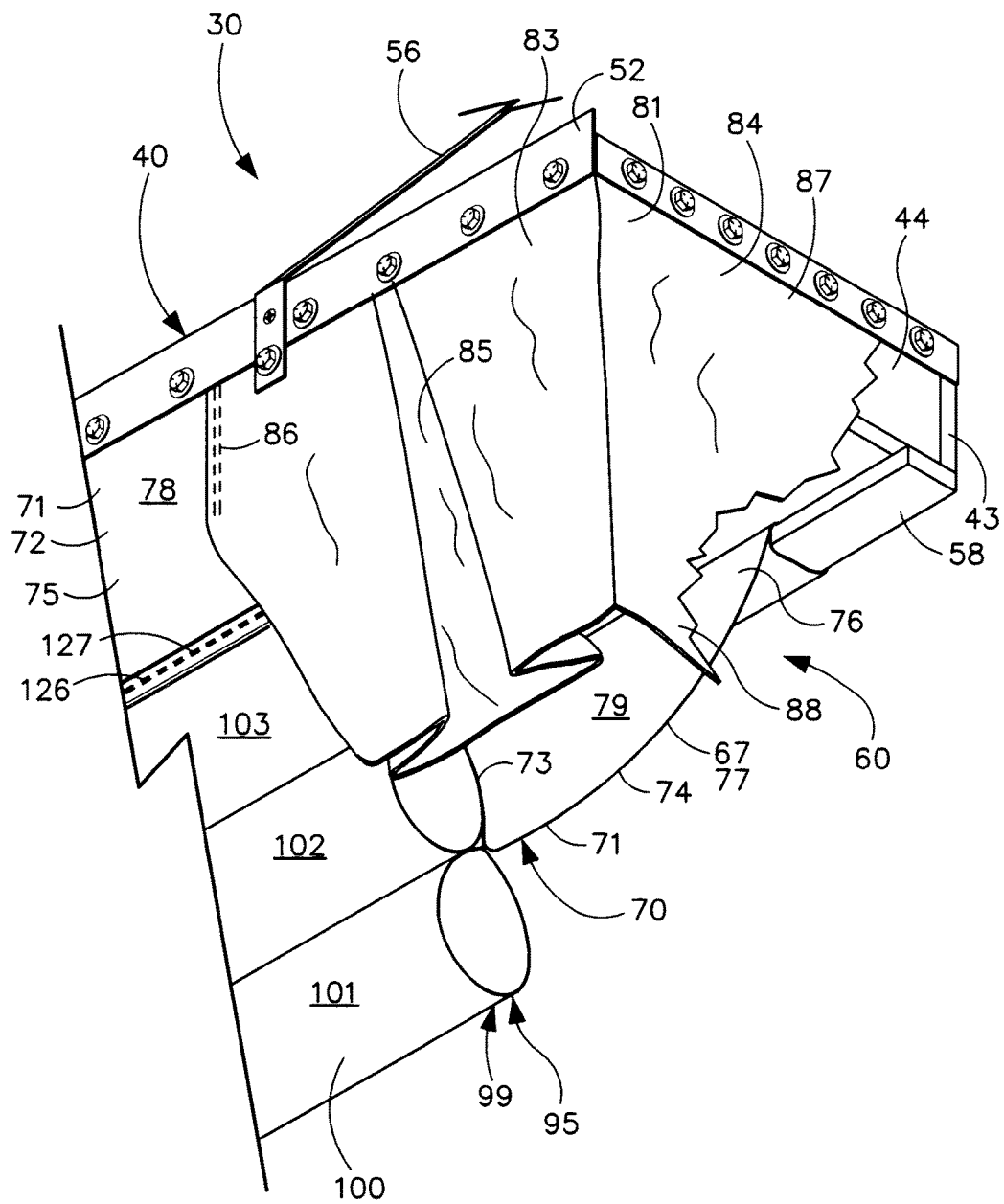
FIG. 5 is an enlarged perspective view of the loading dock rainshield showing the vertical stitching joining an end of the central curtain to the side of the pleated side curtain, and with the wear baffles removed to show the horizontal stitching joining each baffle to the looped curtain, and with a portion of the side curtain cut away to show the curtain.

The header or cantilevered support assembly 40 has a frame 41 formed by framing members 42-44 as best shown in FIGS. 4 and 5. The framing members 42-44 are preferably made of pressure treated or otherwise weather resistant wood, such as 2 by 8 lumber or the like. The front and rear members 42 and 43 extend laterally to the building wall 8, and define the width of the header 40. The rear member 43 butts up against and is anchored or otherwise rigidly secured to the front wall 8 of the loading dock 5. The uniformly spaced cross members 44 extend outwardly from the wall 8, and define the longitudinal length or depth of the header 40. The header 40 has a rectangular shape when viewed from above, with front, rear and side ends or surfaces 45-47. The front 45 and rear 46 ends are generally parallel to the dock wall 8, and the sides 47 are generally perpendicular to the wall. The header 40 has a center or middle peak 49 that is centered and in linear alignment with the middle of the dock door opening 11.

The lateral width of the header 40 is wider than the door opening 11, and its width typically ranges from 108 to 138 inches. The depth or longitudinal outward projection of the header 40 from the building wall 8 typically ranges from about 42 to 52 inches. The front 45 of the header 40 projects from the building wall 8 far enough to allow for the maximum rearward travel of the lowest baffle so that the trailer 20 does not compress the baffles against the building wall 8 or any sealing pad 17 or 18 along the door opening 11. For every inch the bumper pad 10 projects over its typical 4 to 6 inch projection, the header frame 41 also projects one additional inch. For bumpers 10 or sealing pads 17 projecting ten inches from the wall 8, the header 40 has a depth or length of about 42 inches. For sealing pads 18 projecting twenty inches from the wall, the header has a depth or length of about 52 inches. The frame 41 is about eight inches high along its center peak 49 and tapers to a height of about six inches at its lateral side ends 47. A curtain mounting member 58 is firmly secured along the length of the rear frame member 43.

A durable covering 50 is secured to the top of the frame 41 so that the header 40 takes the form of an awning. The cover 50 is water-tight and preferably made of metal or fiberglass. The cover 50 is painted, coated or otherwise treated to inhibit rust or corrosion. A 1½ inch "T" shaped trim 52 is secured along the front end 45. This trim piece 52 acts as a gutter or trough to direct rainwater landing on the cover to run off the side ends 47 of the header 40. The peak 49 of the header 40 is about 15 feet above the ground 15. As shown in FIG. 4, support straps 56 can be provided when needed to add additional support for the front end 45 of the header 40, particularly for buildings that experience significant snow or wind loads.

The canopy seal assembly 60 is secured to and supported by the header assembly 40. The canopy seal 60 includes a flexible sealing component 61 as in FIG. 6. The canopy seal 60 and its sealing component 61 are centered on the header 40, and their center lines are in linear alignment with the center of the dock door opening 11. The sealing component 61 has three segments 62-64. The front segment 62 extends down from the header front 45 and transitions to a weight supporting segment 63. The rear or slack positioning segment 64 extends rearwardly from the middle segment 63 toward the wall 8. The canopy seal assembly 60 has a front, rear and side ends 65-67 that generally coincide with the header front, rear and side ends 45-47. The front end 65 of the sealing component 61 is secured proximal the header front 45. The rear end 66 of the sealing component 61 is secured to proximal the header rear 46. Elongated weights 69 engage the lateral width of the supporting segment 63.

The central sealing component 61 is preferably a flexible weighted curtain assembly 70 as shown in FIGS. 1-6. The curtain assembly 70 has a flexible central curtain 71 that is preferably a single continuous sheet or web of material with a uniform thickness constructed of high strength 50 ounce vinyl or other suitable fabric. The curtain 71 is cut to a generally rectangular shape prior to installation, and has a generally uniform width and length. The lateral width of the curtain 71 is wider than the door opening 11, and its length is longer than the outward projecting length or depth of the header 40. The central curtain 71 spans a major portion of the header 40 width. The curtain 71 width is about 108 inches, or about six inches wider than the 102 inch width of a large trailer 20. This extra width allows central curtain assembly 70 to effectively perform its rain diversion function even when the center of the trailer 20 is off center relative to the door opening 11 and curtain assembly 70.

Figure 6:
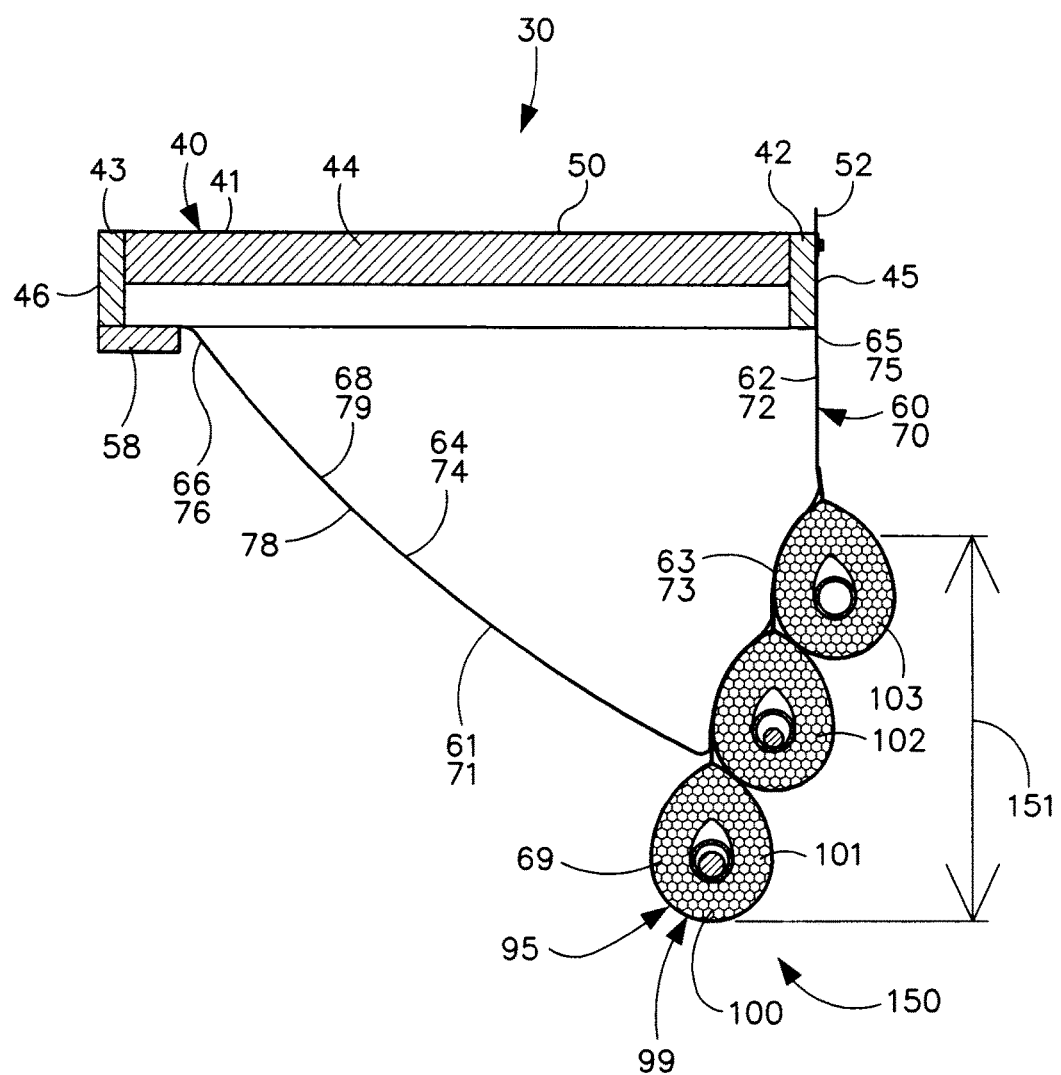
FIG. 6 is a side sectional view taken along line 6-6 of FIG. 1 showing the center curtain in its at rest position with the front end of the front weight bearing segment of the curtain secured to and hanging from the header front, the rear end of the slack positioning segment of the curtain secured to and hanging from the header rear, and the weighted baffles secured to and hanging from the baffle securing segment of the curtain in a staggered and overlapping arrangement below the front of the header, and showing the working range of trailer heights accommodated by the canopy seal.

When installed as in FIG. 6, the central curtain 71 has three integral portions 72-74. The front or weight-bearing portion 72 is firmly secured to the header front 45, and slops predominantly downwardly and possibly slightly rearwardly toward the building wall 8. The front portion 72 transitions to a baffle supporting portion 73 where weighted baffles are located and hung as discussed below. The rear or slack positioning portion 74 extends rearwardly from the baffle supporting portion 73, and slopes upwardly toward the rear end 47 of the header 40. The slack positioning portion 74 is sized to allow the front and baffle supporting portions 72 and 73 to hang generally straight down from the header front end 45 when the rainshield 30 is not engaging a trailer 20 as in FIG. 6. The central curtain 71 extends or drapes down in a semi-looped or looping shape under the header 40. The length of the curtain 71 is greater than the length the header 40 projection from the wall 8. This extra length and the flexibility of the curtain 71, allows the curtain to drop down from the front 45 of the header 40. The shape of the looped curtain 71 is influenced by its interaction with the weighted baffles discussed below.

The central curtain assembly 70 has front and rear ends 75 and 76, sides 77, and an outer or lower surface 78 that generally faces the ground 15, and an inner or upper surface that generally faces the header 40. The front and rear ends 75 and 76 of the curtain 71 generally coincide with the header front and rear ends 45 and 46. The full width of its front end 75 is joined to and supported by the header front member 42. The T-shaped header trim 52 and a number of screw fasteners firmly attach the curtain front end 75 to front member 42. The front end 75 of the curtain 71 is flush with the top of header frame member 42, and hemmed to reinforce the area connecting it to frame member 42 to support the weight of the baffles. The full width of its rear end 76 is secured along the lateral width of the header rear end 46. The rear end of the curtain 71 is wrapped around the curtain mounting member 58 of the frame 41 prior to securing the mounting member to the rear frame member 43. The wrapping and compression between the rear framing members 43 and 58 secures the rear end of the curtain to the rear end 46 of the header 40.

The canopy seal assembly 60 has side curtains 81 and 82 as in FIGS. 1-3 and 5. Each side curtain 81 and 82 has a front portion 83 located along the front 45 of the header 40, and a side portion 84 extending around the corner of the header and along the header side 47. The width of the front portion 83 of each side curtain 81 or 82 is sized to meet existing building dimensions and conditions. The side portion 84 extends the depth of the header 40, or from its front end 45 to the building wall 8. The top end 87 of each side curtains 81 and 82 is bolted or otherwise firmly secured to the header 40. The main body and lower free end 88 of the side curtains 81 and 82 hang substantially straight down along the header front 45 and sides 47. Each side curtain 81 and 82 has a height of about 36 inches. The lower or free end 88 of each side curtain 81 and 82 is about three feet below the 15 foot high header cover 50, or about 12 feet above the ground 15. Like the central curtain assembly 71, the side curtains 81 and 82 are flexible and preferably made of industrial grade vinyl or materials of similar flexibility, strength and durability.

Each side curtain 81 and 82 has a flexible multi-layered pleat or gusset 85. The central curtain 71 is attached to the inner end of each side curtain 81 and 82 via its pleat 85. The inner end of each side curtain 81 and 82 is sewn or stitched 86 to its respective side 77 of the central curtain 71 to produce a continuous three-sided canopy seal assembly 60. The pleats 85 allow the connection between the central and side curtains 71, 81 and 82 to be maintained while the canopy seal 60 inwardly expands when a trailer 20 enters the loading bay 6 as best shown in FIG. 2, and retracts to normal linear alignment along the header front 45 when the trailer departs as in FIG. 3. The side curtains 81 and 82 prevent rainwater running off the header sides 47 from flowing onto the top of a parked trailer or container 20 or into the loading dock 6. The side curtains 81 and 82 and pleats 85 also block airflow and rain on the sides 67 of the canopy seal 60 when the trailer 20 is parked at or entering or leaving the bay.

Figure 7:
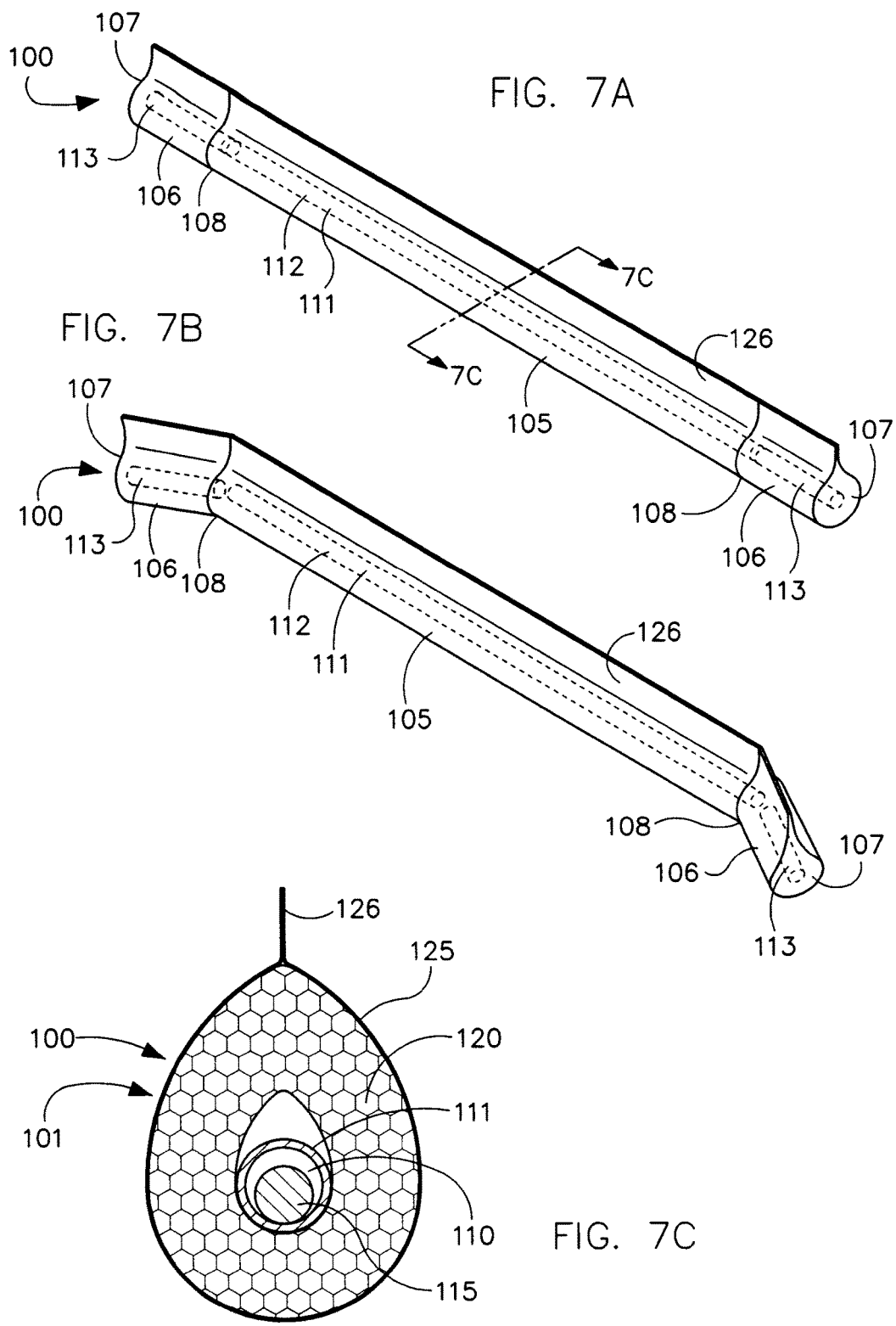
FIG. 7A is a perspective view of the elongated baffle showing its inner tube in phantom lines, with the tubing cut proximal its outer ends to form bendable elbow joints, and showing the outer segments of the baffles in their unbent positions.
FIG. 7B is a perspective view of the elongated baffle showing its outer segments in their bent positions.
FIG. 7C is a side sectional view of the baffle of FIG. 7A showing its inner tube holding a steal weight, the tube being surrounded by compressible padding and wrapped by a durable cover, and showing the overlapping ends of the cover forming a mounting flap.

The canopy seal assembly 60 includes a multi-tiered barrier arrangement or dam 95. The barrier arrangement 95 is preferably formed by a series 99 of staggered, overlapping baffles 100, such as baffles 101-103 shown in FIGS. 4-7. The baffles 100 are part of the weighted canopy seal 60 and its central curtain assembly 70. The baffles 100 have a uniform elongated exterior construction with a generally tear drop shape when viewed from their end as in FIGS. 6 and 7C. The tear drop shaped baffles 100 have a main body with a wider lower portion, narrower upper portion, and wider rounded outer bottom surface that smoothly transitions into rounded side surfaces that narrow towards its top end. Each baffle 100 has a height of about ten inches and a thickness of about seven inches. Each elongated baffle 100 has a longer central segment 105 and two shorter side segments 106 defined by bendable universal or elbow joints 107 proximal its lateral ends 108 as shown in FIGS. 7A and 7B.

The baffles 100 have a weighted interior or core 110, a padded middle layer 120 and a durable exterior cover 125 as shown in FIG. 7C. The weighted interior 110 is includes a metal or PVC, schedule 40 pipe or tube 111. Each tube 111 has a central section 112 and separate outer sections 113. The outer sections 113 are cut from its main central section 112, but are loosely held together by the other baffle components so the outer sections 113 can bend relative to the central section 112. The outer sections 113 are re-attached to the main section 112 via a flexible vinyl or fabric connection (not shown). This construction allows each outer baffle section 106 to flex at either or both ends 108 through 360 degrees and up to about 45 degrees in any given direction to help reduce otherwise concentrated stresses on the curtains 71, 81 and 82 when the trailer 20 enters, leaves or is parked at the loading dock 6. The universal or elbow joints 107 and outer bendable sections 106 also help the central curtain 71 form a better seal with the top 25 of the trailer 20. The bendable universal joints 107 combined with the compressible foam wrap 120 and flexible cover 125 to allow the curtain sides 77 and outer baffle portions 106 to bend and flex through 360 degrees, such as left or right, or up or down.

The central tube portions 112 of the lower two baffles 101 and 102 include a total of about 100 pounds of heavy dense material 115 such as steel to achieve the desired downward pressure across the top surface 26 of the trailer or container 20. The lowest baffle 101 has more weights 115 than the middle baffle 102, which in turn weighs more than the highest baffle 103. The tube 111 of the highest baffle 103 is empty. The baffle 103 has a total weight about 14 pounds. The middle baffle 102 has about 20 pounds of weight 115 in its central tube portion 112, and has a total weight about 34 pounds. The lower baffle 101 has about 80 pounds of weights in its central tube proton 112, and has a total weight about 94 pounds.

A compressible padded foam layer 120 wraps around the core 110 and tube 111 along its entire length of the baffle 100. The foam wrap 120 forms a continuous layer completely surrounding the tube 111. The ends of the foam 120 are cut with a taper to create a tear-drop shape when wrapped around the core 110. The foam layer 120 of the lower baffle 101 is about two inches thick, and has an indentation load deflection (ILD) of about 12 to 18, and a density of about 0.85 to 1.1 pound per cubic foot (PCF). The foam layer 120 of the bottom baffle 101 is preferably softer, or more easily compressed, than the foams for the middle and top baffles 102 and 103. The softer foam 120 allows the bottom baffle 101 to better conform to any peaks or valleys in the top surface 26 of the trailer 20. The pipe 111 of the middle and top baffles 102 and 103 are also wrapped by a two inch thick foam layer 120. The foam is preferably 1236 foam having an ILD of 28-37 and a density of 1.1-1.2 PCF. The foam 120 of the middle and top baffles 102 and 103 is harder than in the foam of the bottom baffle 101 to allow these baffles 102 and 103 to apply a more even pressure across its 108 inch width to the top surface 26 of the trailer or container 20. The middle baffle 102 diverts rain water that is not diverted by the top baffle 103. The top and middle baffles 102 and 103 reduce the amount of weight and sealing pressure need by the bottom baffle 101 to diver any remaining water flowing or blowing under the top and middle baffles.

A cover 125 wraps completely around the core 110 and foam layer 120 of each baffle 100. When secured in place, the cover 125 gives each baffle 100 a tear drop shape. The cover 125 is preferably a heavy duty 50 ounce vinyl or fabric. The cover 125 has overlapping ends that are joined together to hold the core 110 and foam layer 120 in place. The overlapping ends are stitched together to form a flexible mounting flap 126 at the top end of the baffle. The flap 126 extends from the narrower top portion of the tear dropped shaped body of the baffle 100, and has a length of about 2 inches. The flap 126 extends the lateral length of the baffle 100. The ends 77 of the curtain 71 are in registry with the ends 108 of each baffle 100. When installed to the center curtain 71 and header 40, each baffle 100 is in substantial parallel alignment with the front 45 of the header 40 and the planar building wall 8.

The mounting flap 126 of each baffle 100 is fixed to the underside 78 of the center curtain 71 along the length of its lateral width, such as by double stitching 127 the flap 126 to the lower surface 78 of the supporting segment 73 of the curtain 71 continuously across the length of their 71 and 100 lateral widths. Each baffle 101-103 is independently hung from the curtain 71 by its mounting flap 126. Each flap 126 is located a uniform spaced distance of about eight inches from the flaps of its one or more adjacent baffles. This independent securement combines with the flexible nature of the flap 126 and the portion of the central curtain 71 between adjacent flaps to give each baffle 101-103 a desired degree of freedom to move up and down, twist or roll independently from the other baffles. The center and end sections 112 and 113 of the tube 111 are loosely connected via the padding 120 and covering 125 to allow the baffles 100 to bend up to 45 degrees at either or both of their bendable joint 107. The bending motion can occur around the entire 360 degrees of the universal joint 107.

Wear face pleats 130 are draped over the top and front of the each baffle 100. The pleats 130 are secured to the curtain 71 by securement stitching (not shown) located just above the securement stitching 127 for its respective baffle 100. Each wear face pleat 130 hangs down in front of its respective baffle 100 to provide extra durability for the baffles. The pleats 130 are made of high strength 50 ounce vinyl. The wear pleat 130 provides added protection from any sharp steel components of the trailer or container 20 that would otherwise contact the baffles 100 as the trailer or container 20 enters or exits the loading bay 6. The lateral widths or lengths of the curtain 71, baffles 100 and wear pleats 130 are about 108 inches.

When hanging from the curtain 71 in a normal or at rest position 150 as in FIG. 6, the series 99 of baffles 100 are arranged in an overlapping, vertically staggered relationship that self-adjustingly accommodates a range of trailer heights 151. The first or bottom baffle 101 is secured to hang from the support segment 73 of the curtain 71 about seven inches below the second baffle 102. The second or middle baffle 102 is secured to hang from the support segment 73 about seven inches below the third or highest baffle 103. The distance between the bottom end of the bottom baffle 101 and the top end of the top baffle 103 is about two feet or 24 inches. The bottom end of the bottom baffle 101 is about 11 feet 9 inches off grade 15. The top end of the top baffle 103 is about 13 feet 9 inches off grade 15. When in their at rest position 150, the series 99 of baffles 100 are also arranged in an overlapping, horizontally staggered relationship. The top baffle 103 is secured to hang from the supporting segment 73 of the curtain 71 below the header front end 45. The front end of the baffle 103 projects about three inches from the front 45 of the header 40. The middle baffle 102 is secured to hang from the support segment 73 about three inches further back than the top baffle 103. The bottom baffle 101 is secured to hang from the segment 73 about three inches further back than the middle baffle 102. Given the flexibility of the curtain 71 and its light weight relative to the baffles 101-103, when the curtain hangs in its at rest position 150, the front and baffle supporting segments 72 and 73 of the curtain 71 hang in a more vertical or slightly slopped manner from the header front 45, and the rear or slack segment 74 of the curtain 71 angles or curves back toward the rear 46 of the header 40.

The canopy seal assembly 60 and its interconnected center curtain 71 and side curtains 81 and 82 via pleats 85 can expand and contract to accommodate engagement with a wide range of trailer 20 widths. Baffles 101-103 and wear face pleats 130 are sewn to the outer surface 78 of the securing segment 73 of the curtain 71. The curtains 71, 81 and 82 are attached to the front 45 and sides 47 of the header frame 41 to form a complete central seal or header curtain 61 that interacts with the trailer or container 20 as it enters, exits and parks at the loading bay 6 as shown in FIG. 2. All these components work together to adjust to the slope, height, position and movement in all 6 planes of the trailer or container 20, and they work together to maintain constant pressure between the baffles 100 and trailer top surface 26 to effectively divert the flow of rain water off the trailer top surface and down the its sides 23 as it is being loaded or unloaded. The bottom, middle and top baffles 101-103 are free to move or swing backward and upward as the trailer 20 enters the loading bay 6. The baffles 101-103 are also free to twist relative to and out of parallel alignment with the header front 45 and frame 41 if required by the action of the trailer or container 20. The bendable joints or elbows 107 proximal the ends 108 of each baffle 101-103 help facilitate this freedom of movement. The more heavily weighted bottom baffle 101 helps ensure that rainwater 29, not already diverted by the other baffles 102 and 103, is diverted off the top and down the sides of the trailer 20.

Operation of the Rainshield

Figure 9A:
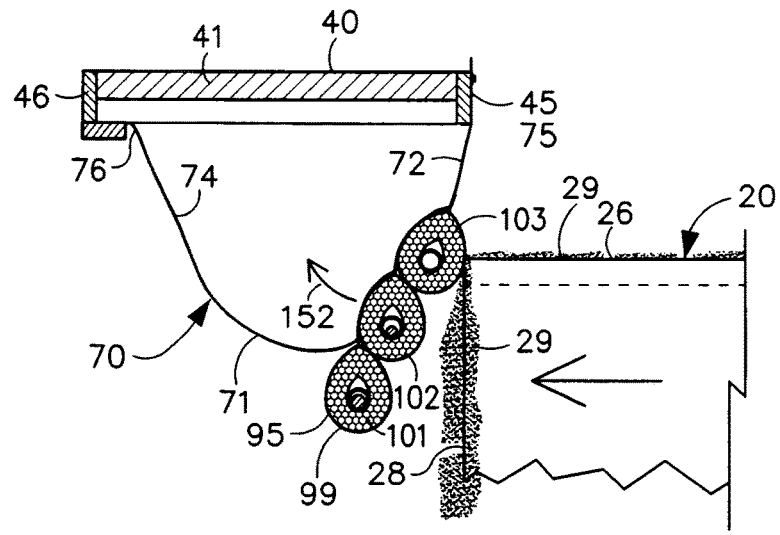
FIG. 9A is a side sectional view showing the looped central curtain and weighted baffles being engaged by a trailer, and the staggered and overlapping arrangement of baffles beginning to swing back and ride up the rear end of the trailer as the trailer backs into the loading bay.

Although the operation of the rainshield 30 should be readily understood based on the above, the following is provided for the convenience of the reader. Prior to engaging a trailer 20, the curtain 71 and baffles 101-103 hang from the header 40 in a normal or home position 150 as in FIGS. 1A-C and 3-6. The front and baffle securing segments 72 and 73 of the curtain 71 are taut due to the weight of the baffles 101-103, and the front end 75 of the curtain is fixed to the front end 45 of the header 40. The distance between the series 99 of baffles 101-103 and the front end 45 of the header 40 remains fixed by the taut curtain segments 72 and 73. The slack positioning segment 74 of the curtain 71 does not inhibit rearward movement of the series 99 of staggered overlapping baffles 101-103, which are free to swing back in a pendulum like movement 152 as shown in FIG. 9A. This allows the rainshield 30 to provide smooth incremental engagement of the baffles 101-103 onto the trailer top 26. The baffles 101-103 incrementally engage the rear end 28 of the trailer 20, and their rounded sides and durable covers 125 facilitates their smooth movement onto the trailer top 26. The swinging pendulum movement 152 of the staggered and overlapping baffles 101-103 prevent any sharp corners of the trailer or container 20 from contacting and damaging the center curtain 71.

When a taller trailer 20 starts to back into the loading bay 6, the trailer engages the top baffle 103 as in FIG. 9A. This initial engagement pushes the series 99 of staggered and overlapping baffles 101-103, and they start to swing back toward the bay 6 in a pendulum like manner 152 about the lower front end 45 of the header 40. As the series 99 of baffles 101-103 are pushed back by the rear end 28 of the trailer 20 they start to move or ride up the rear end 28 of the trailer 20 as the front and baffle securing segments 72 and 73 of the curtain 71 remain taut and are fixed to the front end 45 of the header 40. When the baffles 101-103 swing back and up far enough so that the rounded side of the top baffle 103 is at or near the height of the trailer top 26, the top baffle 103 smoothly slides onto the trailer top 26, and the rear end 28 of the trailer 20 engages the middle baffle 102. Once the weight of the top baffle 103 is resting on the top 26 of the trailer 20, the baffle 103 starts moving along an engaged water sweeping path of travel 154 along the trailer top 26 down the length of the trailer 20 to push water forward and away from the trailer rear end 28 and diverting rainwater 29 so that it flows off the trailer sides 23. The water diversion begins even before the middle 102 or bottom 101 baffles engage the trailer top 26.

Figure 9B:
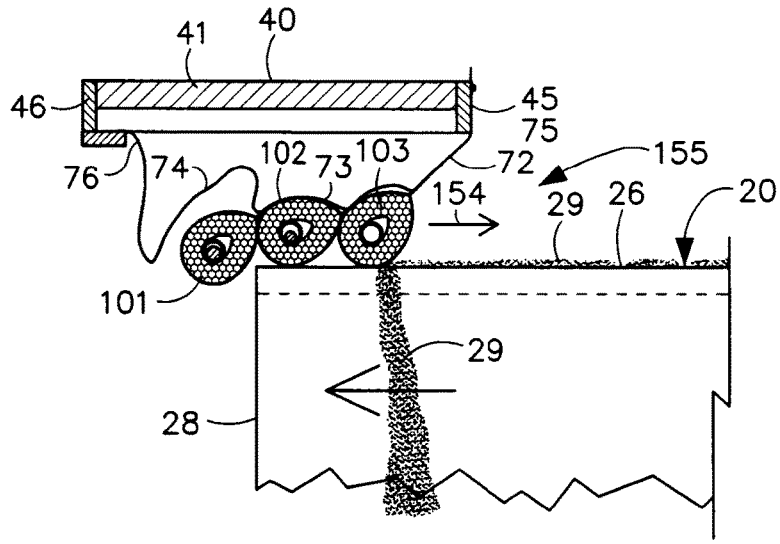
FIG. 9B is a side sectional view showing the middle and top baffles in pressed and sealed engagement with the trailer top, and with the curtain and baffles pulling the more heavily weighted bottom baffle up onto the trailer top as the trailer backs into the loading bay.
Figure 9C:
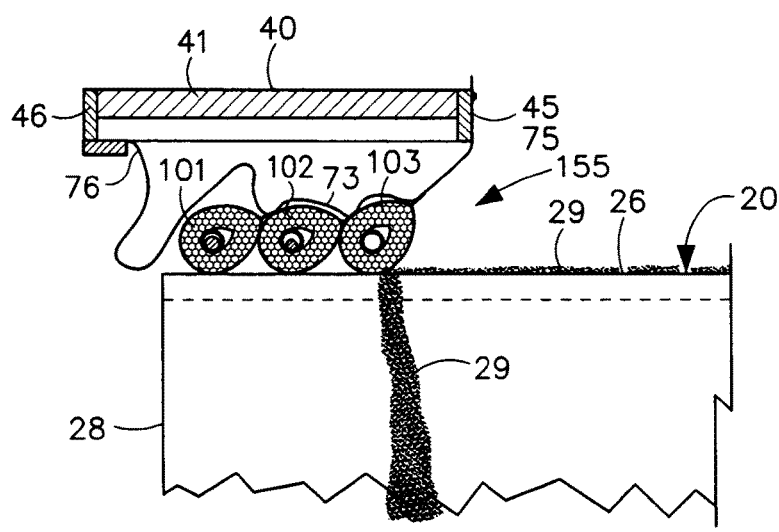
FIG. 9C is a side sectional view showing the three baffles swung back and in pressed and sealed engagement with the trailer top when the trailer is parked in the bay.

As the trailer 20 continues to back into the bay 6, the remaining baffles 101 and 102 swing back and up far enough so that the rounded side of the middle baffle 102 is at the height of the trailer top 26. The middle baffle 102 then smoothly slides onto the trailer top 26, and the rear end 28 of the trailer 20 engages the bottom baffle 101 as in FIG. 9B. The middle baffle 102 now joins the top baffle 103 as they move down the trailer 20 along the water sweeping path of travel 154. As the trailer 20 further continues to back into the bay 6, the remaining bottom baffle 101 swing back and up far enough so that its rounded side is at the height of the trailer top 26, and the bottom baffle 101 slides onto the trailer top 26 as in FIG. 9C. All of the series 99 of baffles 101-103 are now in pressed sealing engagement with the trailer top 26 and move along the water sweeping path of travel 154.

When the trailer rear end 28 engages the dock bumpers 10 and is parked at the loading bay 6, the series 99 of baffles stop moving forward and come to rest at a self-adjusting water diverting position 155.

The side curtains 81 and 82 do not normally engage the sides 24 or top surface 26 of the trailer 20 when the center of the trailer is properly aligned with the center of the dock door opening 11. Still, the flexible side curtains 81 and 82 and their expandable pleats 85 do work in flexible cooperation with the flexible central curtain 71 to allow at least one of the baffles 101-103 to self-adjustingly swing back and up onto the top surface 26 of the trailer and into the water diverting position 155. The side curtains 81 and 82 and pleats 85 are also flexible enough to accommodate the rear end 28 and top surface 26 of the trailer 20 should the center of the trailer be more than about six inches out of alignment with the center of the door 11.

Figure 8:
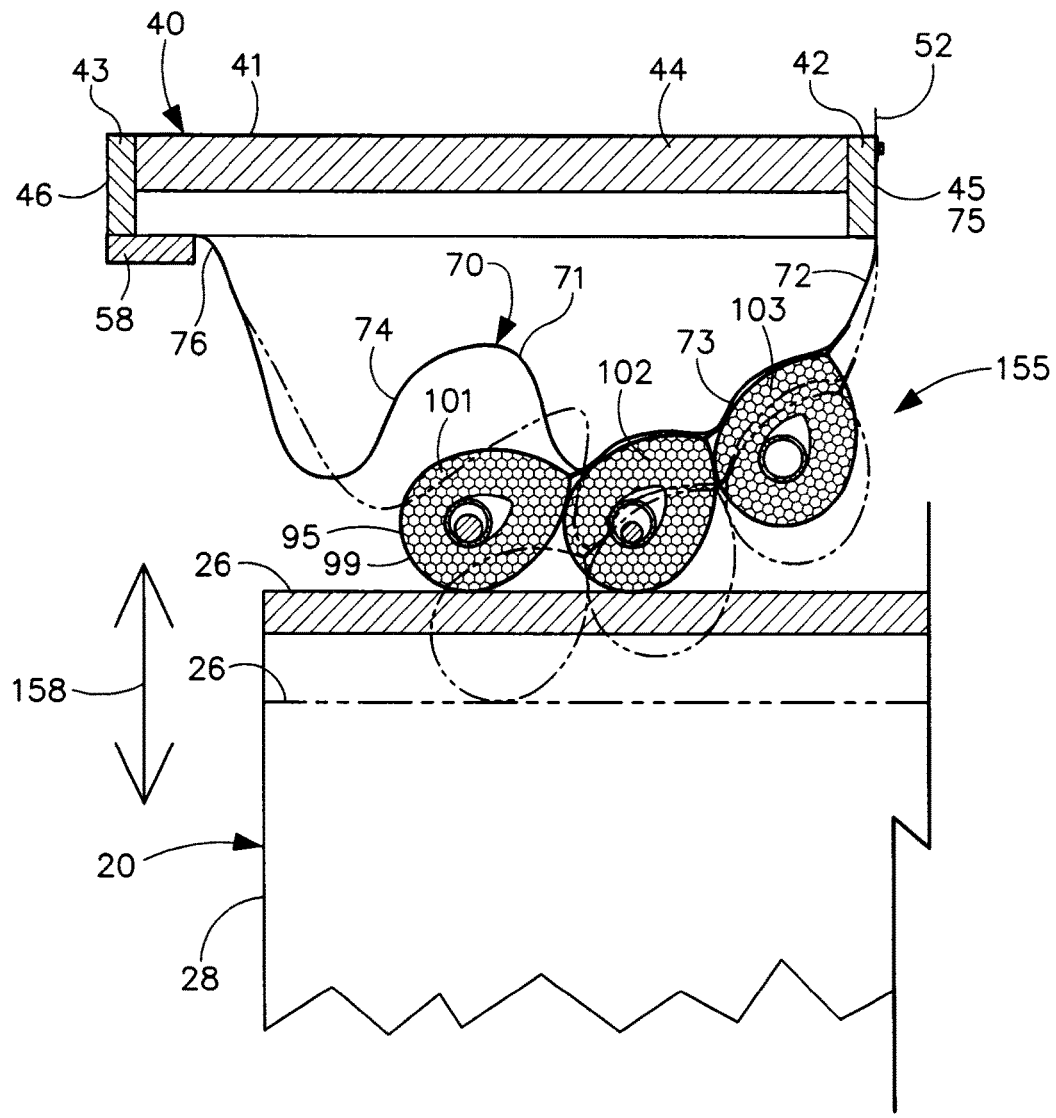
FIG. 8 is a side sectional view showing a trailer parked under the rainshield with the bottom and middle baffles of the central curtain engaging the trailer top prior to loading cargo onto the trailer, and showing the trailer and baffles dropping down in phantom lines with the bottom baffle remaining in pressed and sealed engagement with the trailer top after cargo is loaded to provide a self-adjusting up and down range of motion when cargo is loaded or unloaded.

Only the more heavily weighted bottom baffle 101 need be in pressed sealing engagement with the trailer top 26 to perform the water diverting function as in FIG. 8. Thus, when the flexible curtain 71 and baffles 101-103 are in the water diverting position 155, the curtain 71 and upper baffles 102 and 103 are free to move up and down through a range of motion 158. The range of motion 158 is roughly equal to the height of the combined length of the upper baffles 102 and 103 or at least about a foot while the rainshield 30 continues to perform its water diverting capabilities.

Figure 10A:
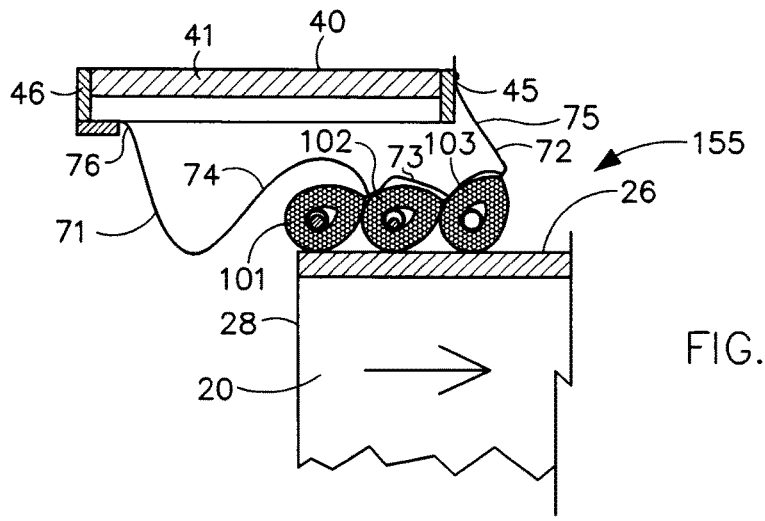
FIG. 10A is a side sectional view showing the front end of the central curtain beginning to pull the baffles off the trailer top as the trailer pulls away from the loading bay.
Figure 10B:
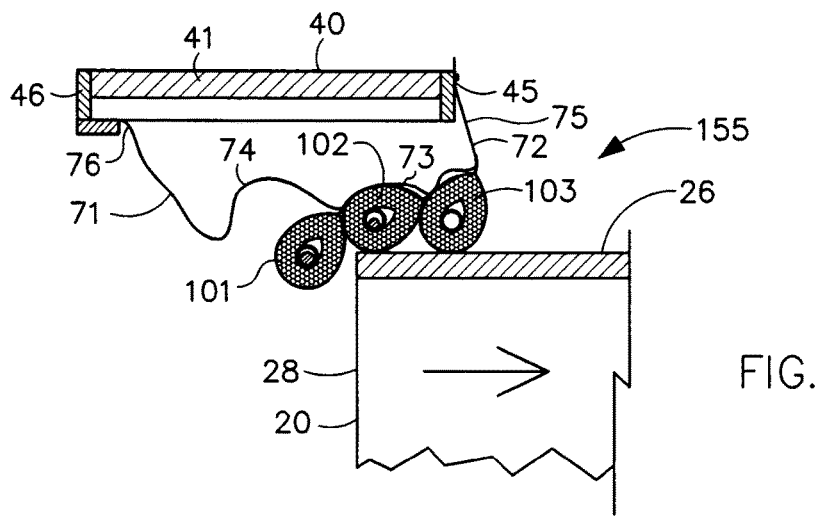
FIG. 10B is a side sectional view showing the bottom baffle releasing from the trailer top and the middle and top baffles engaged with the trailer top, and with the front end of the central curtain and two engaged baffles aiding in the smooth release of the more heavily weighted bottom baffle from the top of the trailer as the trailer continues to pull away.
Figure 10C:
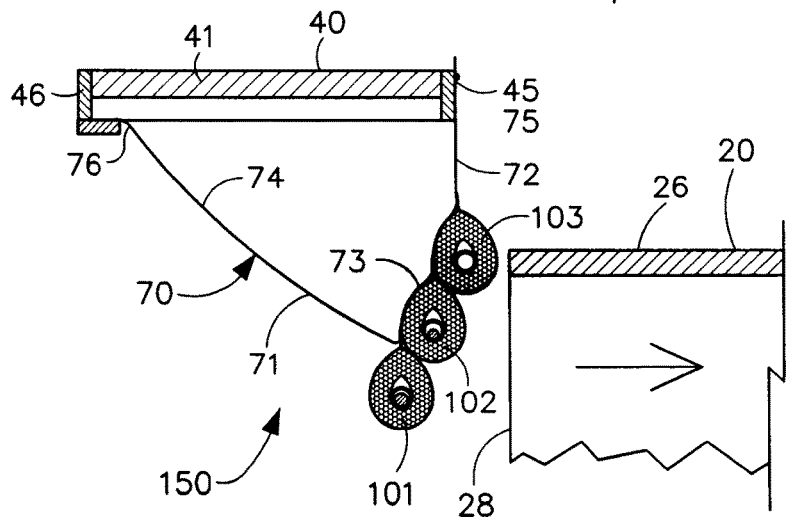
FIG. 10C is a side sectional view showing the central curtain and baffles released from the trailer top and returned to their at rest position after the trailer has pulled away.
Figure 11A:
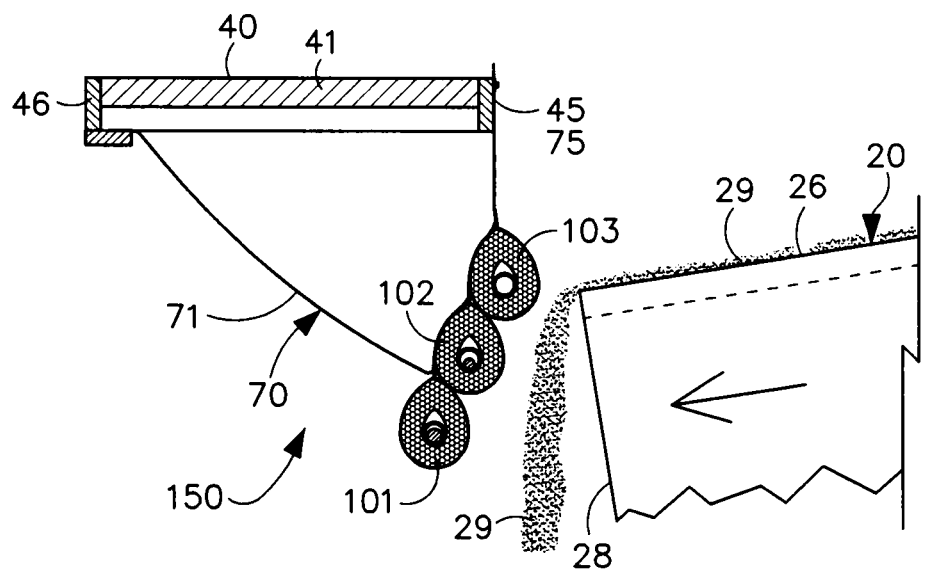
FIG. 11A is a side sectional view showing the rainshield about to engage a trailer approaching the loading bay at a downward angle.
Figure 11B:
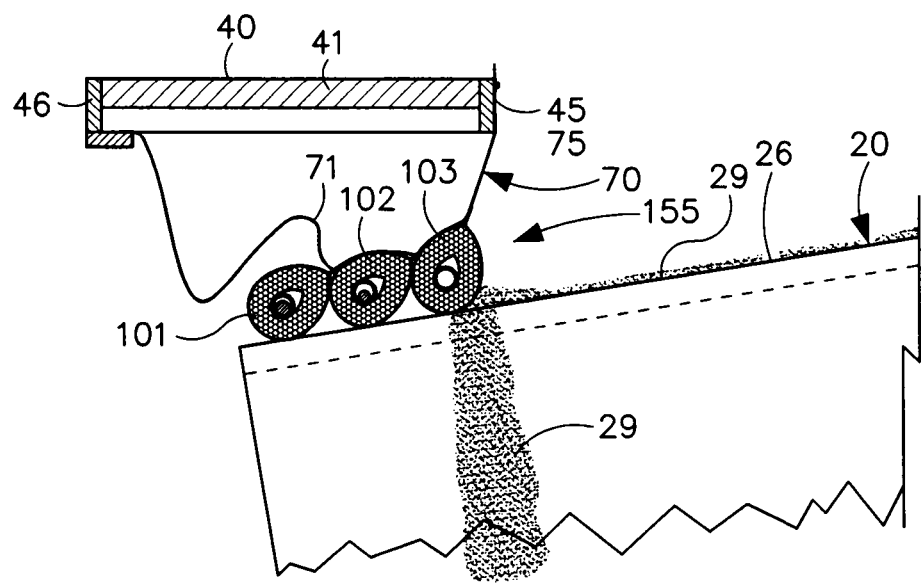
FIG. 11B is a side sectional view showing the rainshield accommodating a trailer parked in the loading bay at a downward angle.
Figure 11C:
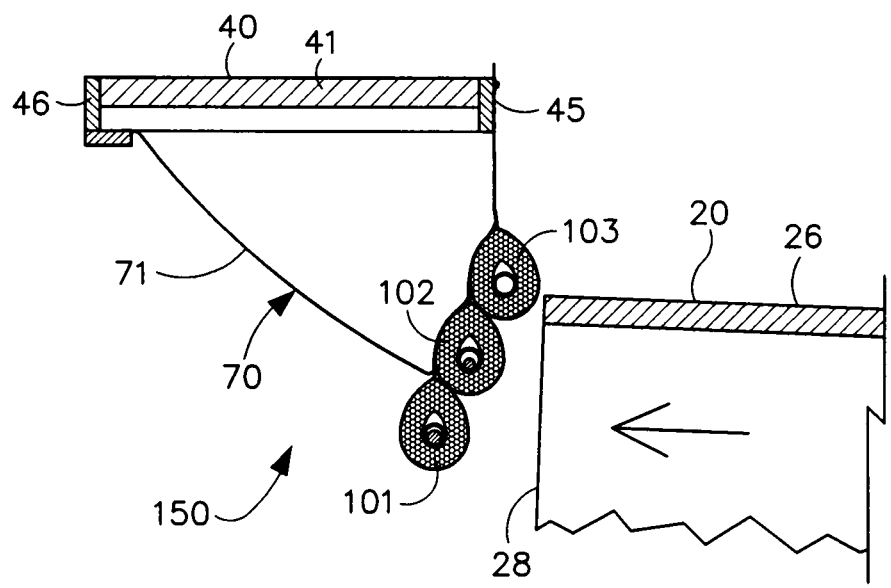
FIG. 11C is a side sectional view showing the rainshield about to engage a trailer approaching the loading bay at an upward angle.
Figure 11D:
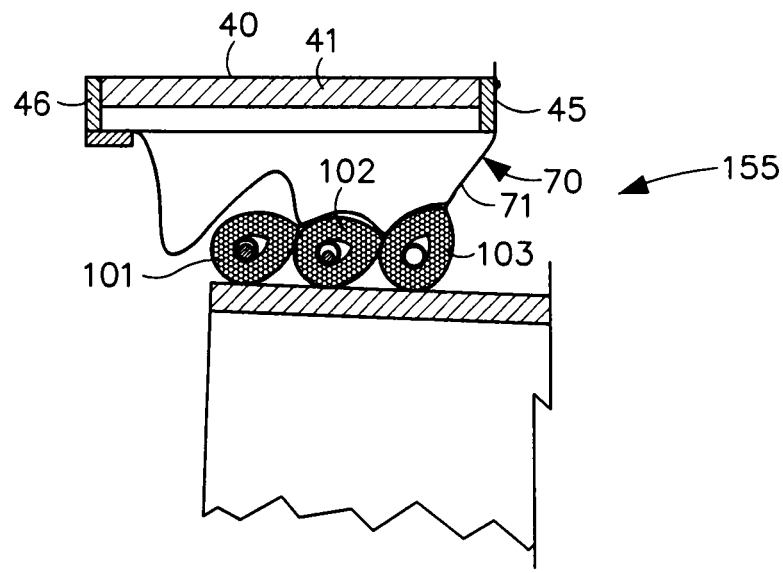
FIG. 11D is a side sectional view showing the rainshield accommodating a trailer parked in the loading bay at an upward angle.

When the trailer 20 pulls away from the loading dock 6, the baffles 101-103 disengage from the trailer top 26 in a smooth manner similar to their engagement with the trailer. As the trailer 20 pulls away, the front end 72 of the curtain 17 become taut and pulls the baffles backward as in FIG. 10A. When the heavier weighted baffle 101 reaches the trailer rear end 28, the baffle rolls off the trailer 20. The downward movement of the more heavily weighted baffle 101 is restrained by the other baffles 102 and 103 still resting on the trailer top 26 as in FIG. 10B. When the middle baffle 102 reaches and rolls off the trailer rear end 28, its downward movement and that of the bottom baffle 101 are similarly restrained by the baffle 103 resting on the trailer top 26. As the trailer 20 continues pulling away and all the baffles 101-103 have slid and rolled off the trailer top 26, the baffles 101-103 return to their staggered overlapping arrangement, and swing down in a pendulum like motion 152, and then back and forth until they settle back into their home position 150 as in FIG. 10C.

The free-flowing, self-adjusting design of the rainshield 30 allows it to adjust to any number of factors that affect the height of the trailer top 26, off-centered alignment of the trailer rear end 28 relative to the loading dock door 11, or side-to-side incline of the trailer 20. The rainshield 30 makes these adjustments without reducing the effectiveness of its rainwater 29 diverting capabilities, and without damaging the rainshield or reducing its durability. The rainshield 30 does not rely on mechanized control to adjust to the trailer angle, the rear axle position, the up and down movement during loading and unloading of cargo, trailer tilt from left to right, and miss-spotting of the trailer or container.

Trailers and containers 20 undergo significant up and down movement when they are parked in a bay 6 and cargo is loaded and unloaded from the bed of the trailer or container. The rainshield 30 self-adjusts for this movement as shown in FIG. 8. When the weighted baffles 101-103 are in their self-adjusting water diverting position 155, the baffles 101-103 are free to move up and down with the trailer or container 20 while maintaining its water diverting ability.

Modern trailers and containers 20 allow personnel to fix the rear axle in a variety of positions near or farther away from the rear of the trailer or container. Yet, on an inclined or declined approach 15, the height of the trailer top 26 at the bay 6 can differ by several inches from the level height. When the axle is frontward, the height of the trailer 20 at its rear end 28 will be even higher on an incline and even lower on a decline. The free-floating characteristics of the diverter baffles 100 effectively adjusts to differences in trailer or container height and angle of top regardless of axle position as best shown in FIGS. 11A-D. The curtain 71 and baffles 101-103 move up and down with variances in trailer height and the rounded sides of the tear drop shaped baffles 100 rotate while they remain in constant pressed sealing engagement across the width of the trailer top 26. The power to divert rainwater 29 flowing down the trailer top 26 remains relatively constant regardless of axle position.

The rainshield 30 self-adjusts for any tilting of the trailer 20 as shown in FIG. 12. Trailers and containers 20 can tilt to one side for a variety of reasons. The tires on one side of the trailer or container 20 can be more or less inflated than the other. The weight inside a loaded trailer or container 20 may not be evenly distributed. The approach 15 of the bay 6 may not level. The rainshield 30 allows each of the baffles 101-103 to rise up in a laterally non-uniform manner. The free flowing design of the rainshield 30, allows the baffles 100 to self-adjust to achieve and maintain their water diverting position 155 and their pressed and sealed engagement across the width of the trailer top 26 even when one side of the trailer 20 and one side of the baffle are at a different height above ground level 15 than the other side of the trailer and other side of the baffle. The water diverting function of the baffles 101-103 is not diminished.

Figure 13:
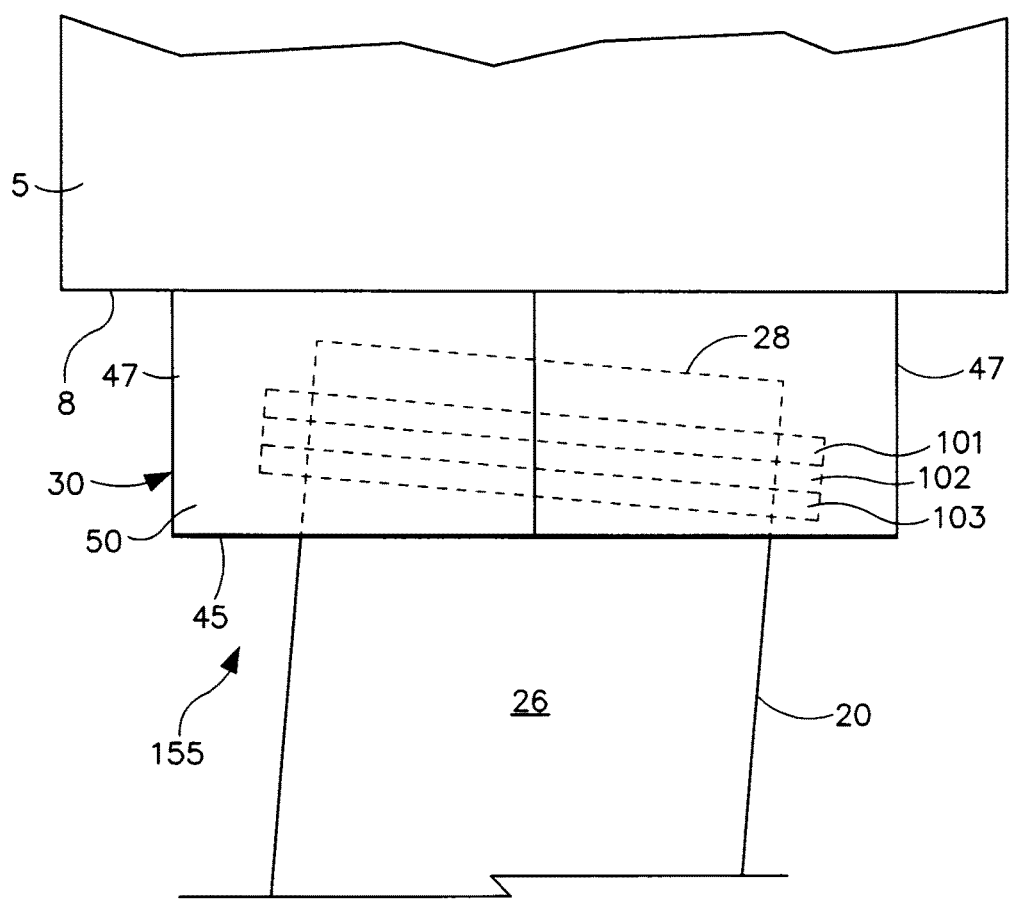
FIG. 13 is a top view showing the rainshield accommodating an angularly misaligned trailer backed into the loading bay.

The rainshield 30 self-adjusts for angled trailers 20 as shown in FIG. 13. The curtain 71 is free to twist to compensate for an angled approach. This freedom is facilitated by the pleated 85 side curtains 81 and 82. The curtain 71, baffles 100 and wear face pleats 130 can twist to match the angle of the entering or exiting trailer 20.

Figure 14A:
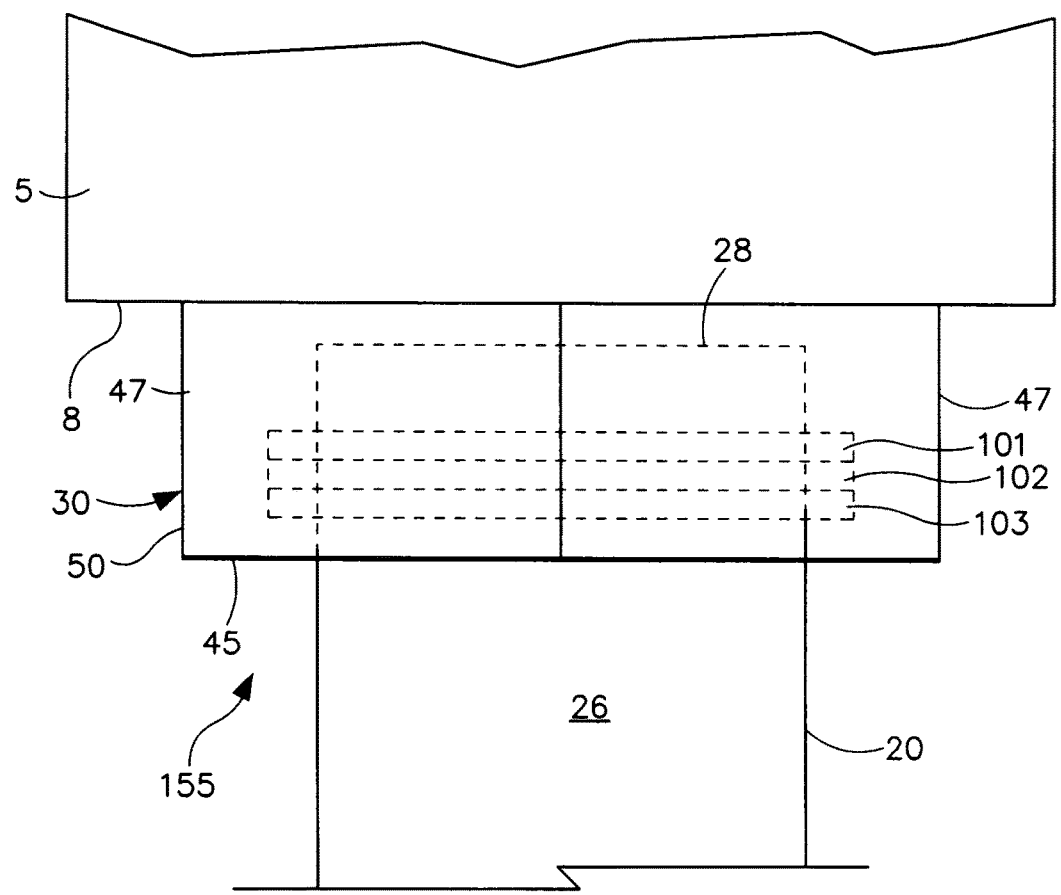
FIG. 14B is a front end view showing the rainshield accommodating a properly laterally aligned or spotted trailer parked in the loading bay.
Figure 14B:
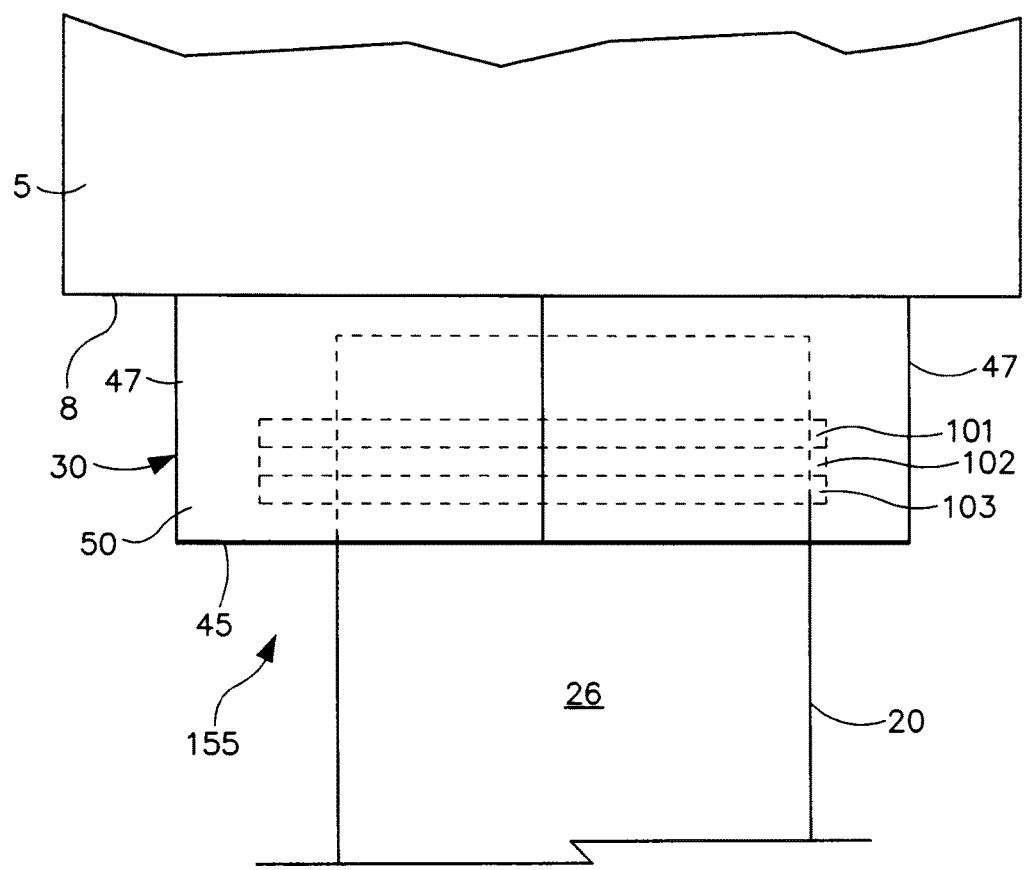

The rainshield 30 self-adjusts for miss-spotted trailers 20 as in FIGS. 14A-B. The lateral width of the central curtain 71 and side curtains 81 and 82 allows for laterally miss-spotted trailers 20. The water diverting function of the baffles 101-103 is not diminished.

Figure 1B:
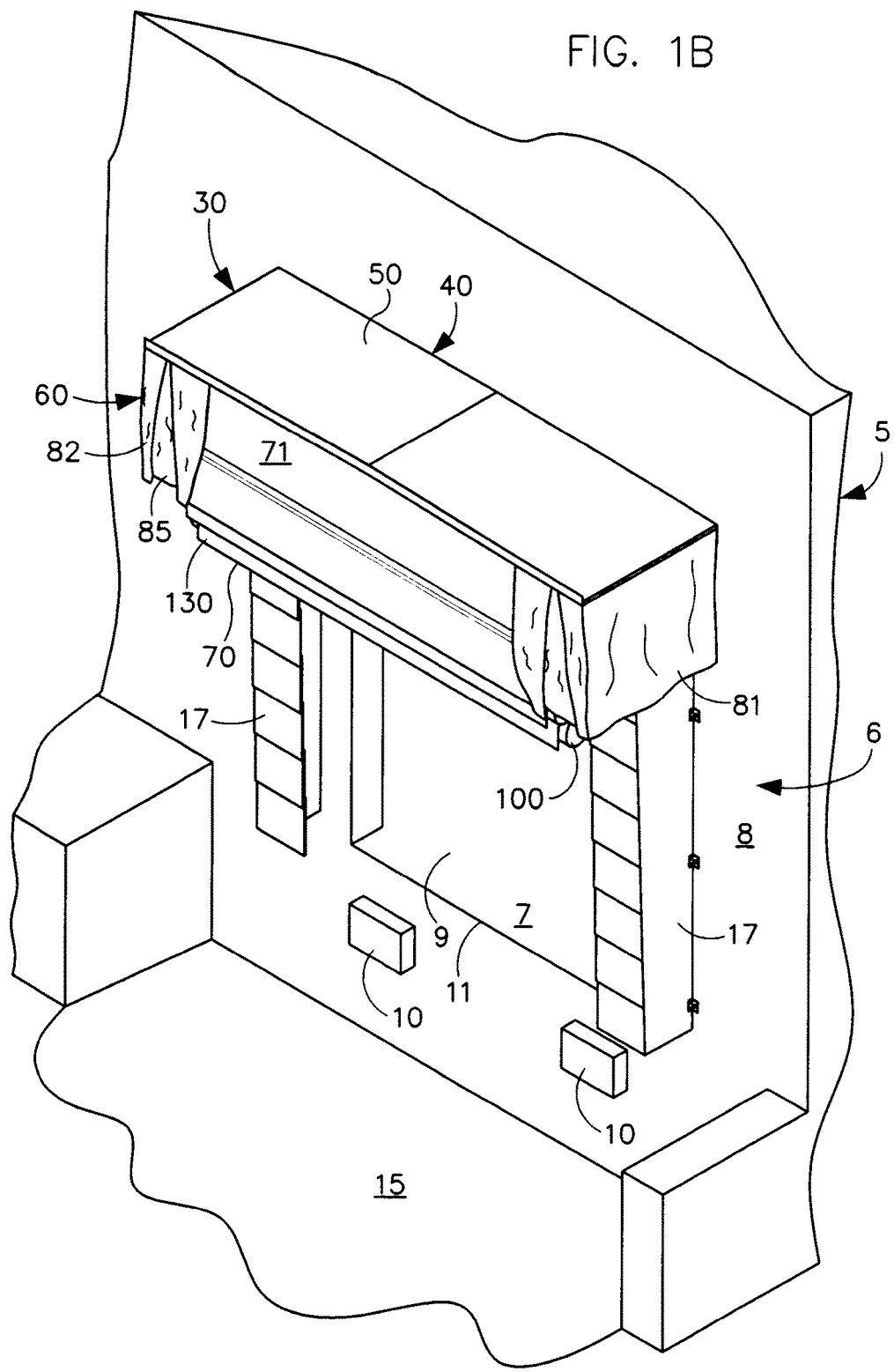
FIG. 1B is a perspective view of the loading dock rainshield used in conjunction with conventional side wiping seals.
Figure 1C:
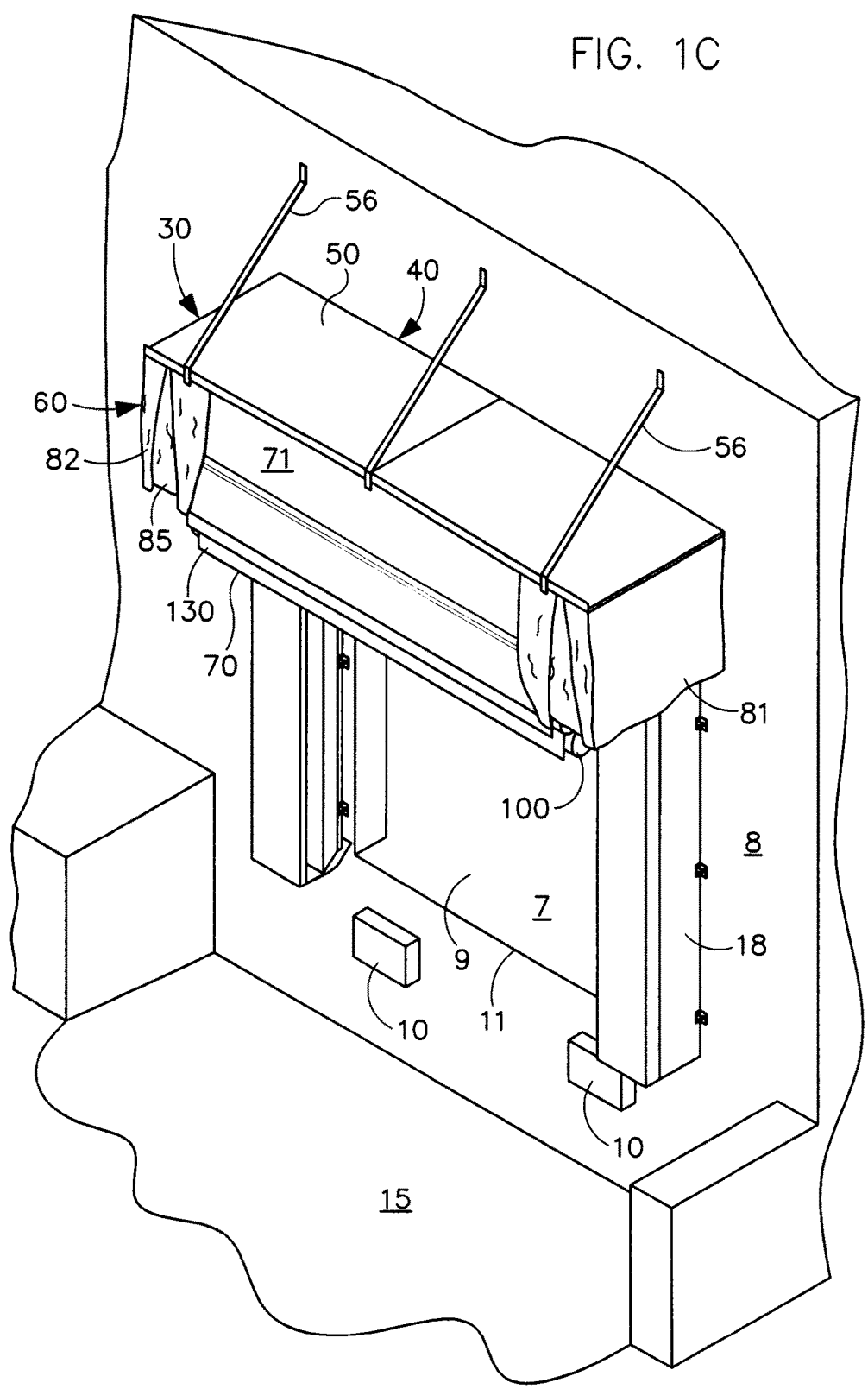
FIG. 1C is a perspective view of the loading dock rainshield used in conjunction with conventional dual side compression and wiping seals, and with angled brackets supporting the front of the header.

The rainshield can be readily used with compression seals and side wiping seals as shown in FIGS. 1B and 1C. Use with compression seal products 18 simply requires header 40 projection be adjusted to allow the bottom baffle 101 to engage the trailer top 26 before the trailer rear end 28 contacts the surfaces of the compression product. The rainshield 30 effectively diverts rainwater 29 off the trailer top 26 before the water reaches the compression seal product. The rainshield 30 can be readily used with a shelter product and inflatable products by simply having the rainshield header 40 replace the header frame of the shelter or inflatable product. Proper installation of the rainshield 30 ensures the bottom baffles 101 is not pinched between trailer 20 and the building wall 11 or other obstructions, such as compression seal pad. The header projection is equal to or greater than the sum of the height of the curtain segments 72 and 72 and the outward projection of the dock bumper pads 10 or any horizontal top compression seal.

While the invention has been described with reference to a preferred embodiment, it will be understood by those skilled in the art that various changes may be made and equivalents may be substituted without departing from the broader aspects of the invention. For example, it should be understood by persons of ordinary skill in the art that the header frame can be constructed of steel, aluminum, or other suitable materials. While the frame is preferably 138 inches wide and 42 inches deep, the dimensions can vary depending on the size of the loading dock opening and the type and dimensions of the trailer or container. The central curtain can be fabricated with various types of suitable materials such as vinyl with differing weights and specifications, or other fabric. It should also be understood that reduced scale versions of the rainshield, such as a version only incorporating the bottom two weighted baffles or a version incorporating only the bottom baffle, are covered by the broad scope of this design. For example, a version incorporating the same basic characteristics but servicing only 12 foot 6 inch or taller trailers with only the bottom two baffles is covered by the scope of the invention. Similarly, a version incorporating the same basic characteristics but servicing only 13 foot and taller trailers or containers with only the bottom baffle would be covered by the broader scope of the invention. It should also be understood that the rainshield can be incorporated with a variety of known or yet to be designed products and systems for sealing the opening between the rear end of the trailer or container 20 and the building wall or dock door opening.

We claim:

1. A loading dock rainshield for diverting rainwater on the top surface of a trailer toward the side of a trailer when the trailer enters and parks at the loading dock, the loading dock having a planar building wall and a door opening leading into an interior of the loading dock, the trailer having a rear end and the door opening having a door opening width, said loading dock rainshield comprising:

a header assembly positioned above and projecting outwardly from the loading dock door opening, said header assembly having a header front end, a header rear end and opposed header side ends, said header front and rear ends defining a header depth, and said header side ends defining a header width, said header width being at least as wide as the door opening width;

a curtain assembly with a flexible central curtain, said curtain assembly having a curtain front end, a curtain rear end and opposed curtain side ends, said curtain front end being secured to said header assembly along said header width proximal said header front end, said curtain rear end being secured to said header assembly along said header width proximal said header rear end, said curtain front and rear ends defining a curtain length, said central curtain having a curtain length longer than said header depth and said flexible central curtain hanging down in a generally looped configuration between said curtain front and rear ends, and said curtain side ends defining a curtain width;

a series of elongated weighted baffles secured to said flexible central curtain, said weighted baffles having a vertically staggered and overlapping alignment and being positioned below and in proximal alignment with said header front end when in a home position, each baffle extending across said curtain width and in substantially parallel alignment with the planar wall of the loading dock, each of said baffles being secured to said flexible central curtain toward said curtain front end and at a vertically staggered height relative to adjacent baffles when said center curtain and baffles are in said home position; and wherein at least one of said series of elongated weighted baffles is adapted to self-adjustingly swing back and up onto the top surface of the trailer and into a water diverting position when engaged by the rear end of the trailer as the trailer enters and parks at the loading dock, and wherein said at least one elongated weighted baffle is adapted to form a pressed and sealed engagement across the top surface of the trailer when in said water diverting position to divert the rainwater toward the side of the trailer and prevent the rainwater from flowing or blowing off the rear end of the trailer, through the door opening and into the interior of the loading dock.

2. The loading dock rainshield of claim 1, and wherein said looped configuration of said central curtain extends down from said header at least about two feet and each of said elongated baffles has a height of at least about ten inches, and wherein said rainshield is adapted to accommodate a two foot range of trailer heights with said at least one elongated baffle swinging back and up onto the top surface of the trailer and into said water diverting position.

3. The loading dock rainshield of claim 2, and wherein said rainshield is adapted to accommodate a range of trailer heights between about 11 feet 9 inches and about 13 feet 9 inches.

4. The loading dock rainshield of claim 1, and wherein said looped configuration of said central curtain and said series of baffles are free to move up and down through a range of motion when in said water diverting position on the top surface of the trailer, and wherein said looped configuration of said central curtain and said baffles self-adjustingly move up and down with said at least one elongated weighted baffle remaining in said pressed and sealed engagement with the top surface of the trailer when the top surface of the trailer moves up and down during the loading and unloading of the trailer.

5. The loading dock rainshield of claim 1, and wherein at least one of said series of baffles moves along a sweeping path of travel along the length of the trailer when in said water diverting position while the trailer is entering the loading dock to push the rainwater away from the rear end of the trailer.

6. The loading dock rainshield of claim 1, and wherein said central curtain width is shorter than said header width, and said rainshield further includes opposed side curtains, each side curtain having a front portion spanning between one of said header side ends and one of said curtain side ends.

7. The loading dock rainshield of claim 6, and wherein said side curtains are flexible, have an upper secured end, a lower free end and a main body, said main body and lower free end being free to move, and said front portion of each of said opposed side curtains has an expandable pleat and is securely attached to one of said curtain side ends, and wherein said side curtains work in flexible cooperation with said flexible central curtain to allow said at least one elongated weighted baffle to self adjustingly swing back and up onto the top surface of the trailer and into said water diverting position.

8. The loading dock rainshield of claim 7, and wherein each of said side curtains has a side portion spanning between said header front end and said header rear end.

9. The loading dock rainshield of claim 1, and wherein said flexible central curtain has an underside and each baffle is secured to and hangs from said underside of said central curtain by a flexible baffle mounting flap.

10. The loading dock rainshield of claim 9, and wherein each said mounting flap is secured to said central curtain at a uniform spaced location from other said baffle mounting flaps, each mounting flap has a desired length and each baffle is independently secured to said flexible central curtain, and wherein each baffle has a freedom of motion to move up and down, twist and roll independently from other said baffles.

11. The loading dock rainshield of claim 1, and wherein said swinging motion of said series of baffles keeps said flexible central curtain away from pressed engagement with the rear end and top surface of the trailer.

12. The loading dock rainshield of claim 1, and wherein said baffles have an elongated center portion, opposed end portions and flexible universal joints, said elongated central portion being constructed in linear alignment with said opposed outer portions, and said flexible universal joints allowing said opposed end portions to bend up to about 45 degrees out of said linear alignment and through a 360 degree circumference of said baffle.

13. The loading dock rainshield of claim 1, and wherein each baffle has a baffle length substantially equal to said curtain width, and each baffle is secured to said flexible central curtain entirely across said curtain width.

14. The loading dock rainshield of claim 1, and wherein said baffles have a tear drop shape formed by a main body with a wider lower portion, narrower upper portion, rounded lower surface and rounded side surfaces, and said rounded lower surface smoothly transitions into said rounded side surfaces, and said mounting flap extends from said narrower upper portion.

15. The loading dock rainshield of claim 1, and wherein said baffles have a core and a padded layer surrounding said core.

16. The loading dock rainshield of claim 15, and wherein said baffles have a durable outer covering that wraps around said core and padded layer, and said covering overlaps to form said mounting flap.

17. The loading dock rainshield of claim 16, and wherein said series of baffles includes at least two baffles, said at least two baffles including a bottom baffle and a top baffle.

18. The loading dock rainshield of claim 17, and wherein said core is adapted to allow added weight to be placed inside said baffle, and at least said bottom baffle has added weights placed in its said core, said bottom baffle weighing more than said top baffle, and wherein said series of baffles increase in weight from said top baffle to said bottom baffle.

19. The loading dock rainshield of claim 18, and wherein said series of baffles includes at least three baffles, said at least three baffles including a bottom baffle, a middle baffle and a top baffle.

20. The loading dock rainshield of claim 19, and wherein each of said baffles has an independent weight of about 14 pounds, said bottom baffle has about 80 pounds of added weight add to its said core, and said middle baffle has about 20 pounds of added weight added to its said core, said bottom baffle having a total weight of about 94 pounds, said middle baffle having a total weight of about 34 pounds and said top baffle having a total weight of about 14 pounds.

* * * * *